United States Patent
Lo

(10) Patent No.: US 11,032,531 B2
(45) Date of Patent: Jun. 8, 2021

(54) MOBILE DEVICE HAVING A 3D DISPLAY WITH SELECTABLE MAGNIFICATION

(71) Applicants: US Technology, Ltd., Chai Wan (HK); Kwok Wah Allen Lo, Causeway Bay (HK)

(72) Inventor: Kwok Wah Allen Lo, Causeway Bay (HK)

(73) Assignee: 3D MEDIA LTD., Chai Wan (HK)

( * ) Notice: Subject to any disclaimer, the term of this patent is extended or adjusted under 35 U.S.C. 154(b) by 162 days.

(21) Appl. No.: 15/308,423

(22) PCT Filed: May 4, 2015

(86) PCT No.: PCT/US2015/029050
§ 371 (c)(1),
(2) Date: Nov. 2, 2016

(87) PCT Pub. No.: WO2015/171497
PCT Pub. Date: Nov. 12, 2015

(65) Prior Publication Data
US 2017/0064282 A1    Mar. 2, 2017

Related U.S. Application Data

(60) Provisional application No. 62/154,786, filed on Apr. 30, 2015, provisional application No. 62/003,210, (Continued)

(51) Int. Cl.
*H04N 13/229* (2018.01)
*H04N 13/354* (2018.01)
(Continued)

(52) U.S. Cl.
CPC .......... *H04N 13/139* (2018.05); *G02B 30/27* (2020.01); *H04N 5/23245* (2013.01);
(Continued)

(58) Field of Classification Search
CPC .......... H04N 13/0029; H04N 5/23245; H04N 13/0007; H04N 13/004; H04N 13/0242;
(Continued)

(56) References Cited

U.S. PATENT DOCUMENTS 5,680,171 A * 10/1997 Lo ............................ H04N 1/23
348/42
2006/0114415 A1 * 6/2006 Shestak .................. G02B 30/27
353/7

(Continued)

FOREIGN PATENT DOCUMENTS

GB    2405543 A *  3/2005  ......... G02B 27/2214

*Primary Examiner* — Patrick E Demosky
(74) *Attorney, Agent, or Firm* — Ware, Fressola, Maguire & Barber LLP

(57) ABSTRACT

A mobile device has at least two camera lenses for taking a first image and a second image for forming a 3D image and a processor for composing a composite image from first image strips compressed from the first image and second image strips compressed from the second image in an interlaced manner. The composite image is conveyed to a display panel so that a viewer can see a 3D image through a parallax sheet with parallax separating units. The 3D image can be displayed with different magnification factors. When four lenses are used for taking a first pair of images and a second pair of images, the first pair is used for composing the composite image and the 3D image is viewed through a lenslet sheet.

20 Claims, 18 Drawing Sheets

Related U.S. Application Data filed on May 27, 2014, provisional application No. 61/989,746, filed on May 7, 2014.

(51) Int. Cl.
*H04N 13/139* (2018.01)
*H04N 13/106* (2018.01)
*H04N 13/156* (2018.01)
*H04N 13/243* (2018.01)
*H04N 13/282* (2018.01)
*H04N 13/305* (2018.01)
*H04N 13/31* (2018.01)
*H04N 13/398* (2018.01)
*G02B 30/27* (2020.01)
*H04N 5/232* (2006.01)

(52) U.S. Cl.
CPC ......... *H04N 13/106* (2018.05); *H04N 13/156* (2018.05); *H04N 13/243* (2018.05); *H04N 13/282* (2018.05); *H04N 13/305* (2018.05); *H04N 13/31* (2018.05); *H04N 13/398* (2018.05)

(58) Field of Classification Search
CPC ......... H04N 13/02082; H04N 13/0404; H04N 13/0409; H04N 13/0497; H04N 13/229; H04N 13/305; H04N 13/31; H04N 13/312; H04N 13/354; G02B 27/2214; G02F 2001/294
See application file for complete search history.

(56) References Cited

U.S. PATENT DOCUMENTS

| | | |
|---|---|---|
| 2007/0285509 A1 | 12/2007 | Lee |
| 2008/0231767 A1* | 9/2008 | Lee ........................ G02B 30/27 349/15 |
| 2010/0220177 A1 | 9/2010 | Park |
| 2013/0286059 A1* | 10/2013 | Saishu ..................... G09G 3/20 345/698 |
| 2015/0130916 A1* | 5/2015 | Hamagishi ........... H04N 13/324 348/59 |

* cited by examiner

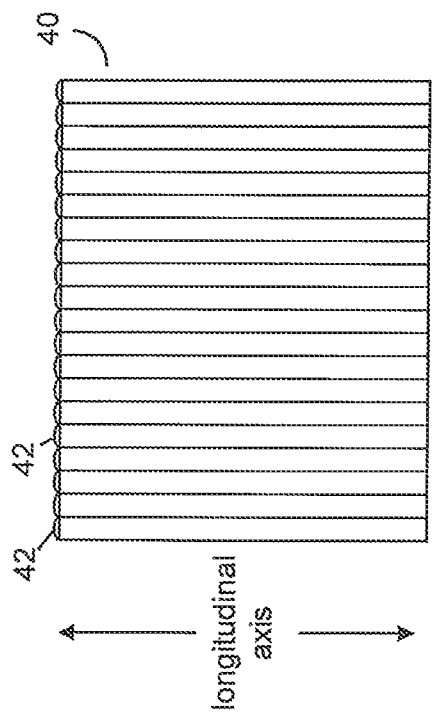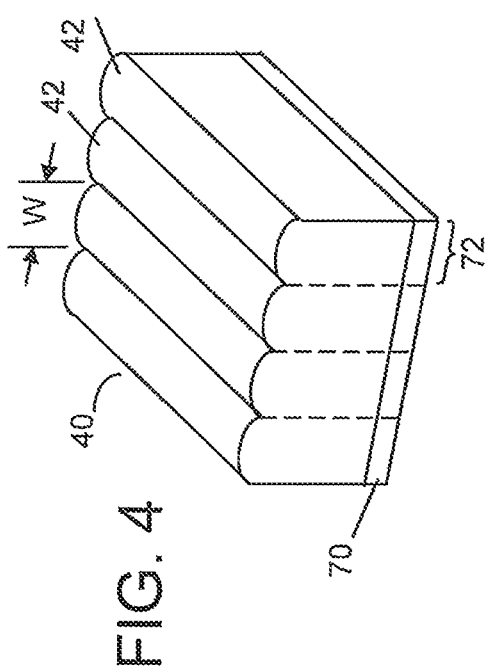

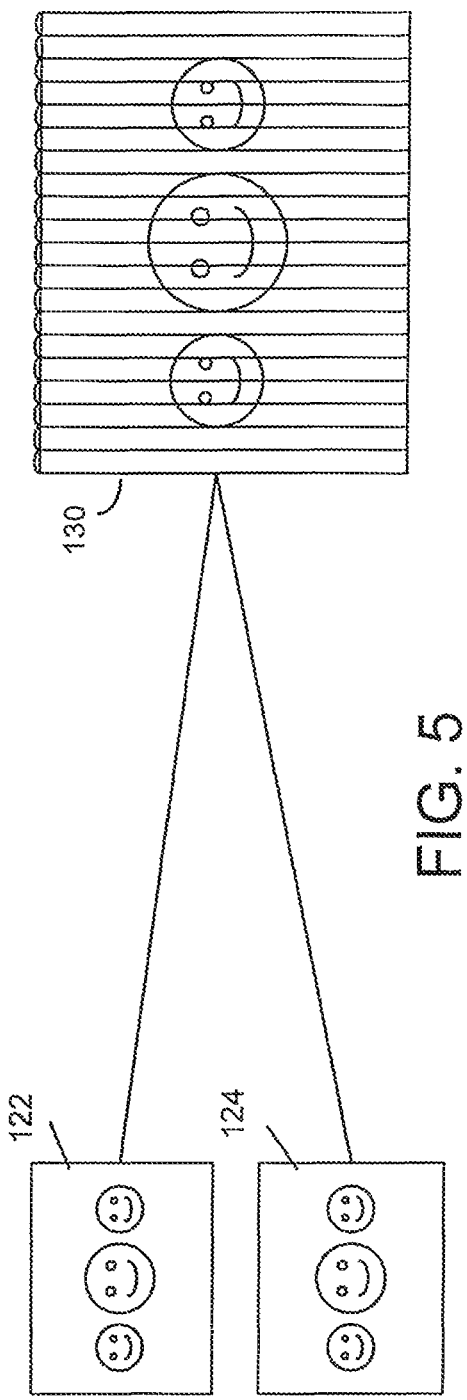
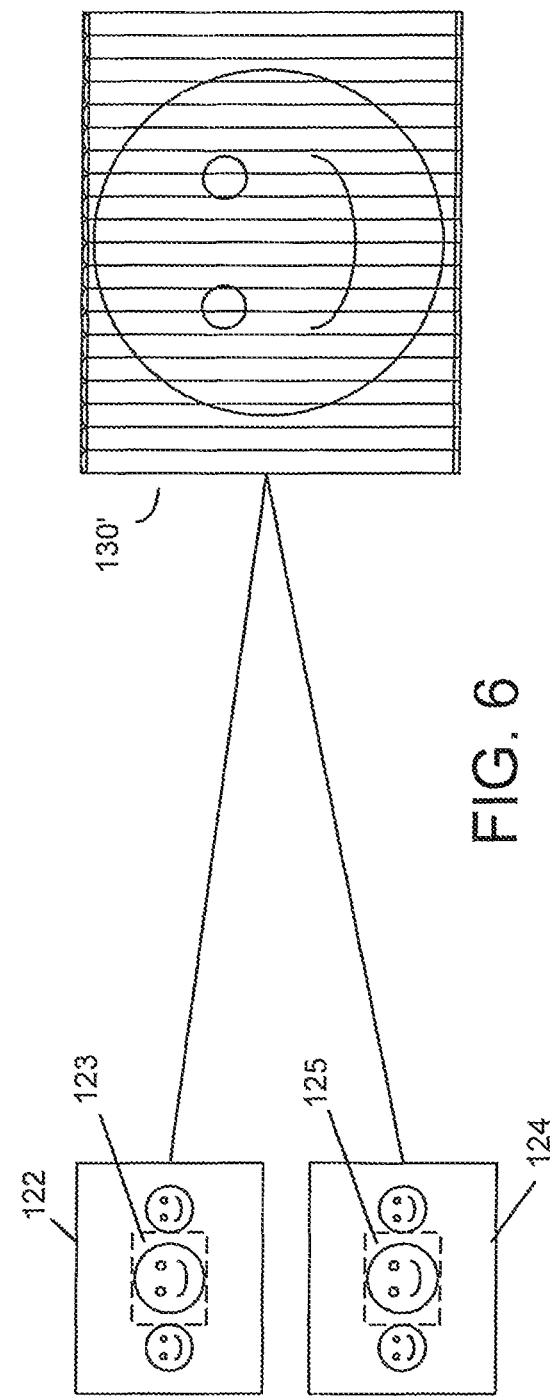
FIG. 5
FIG. 6

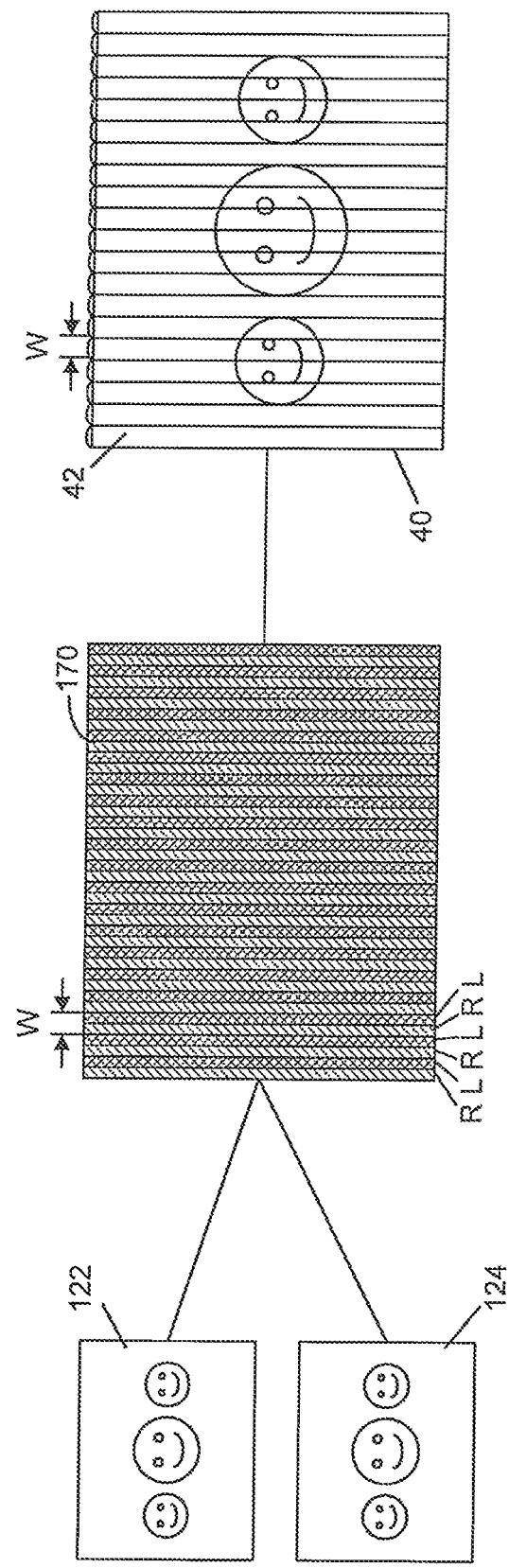

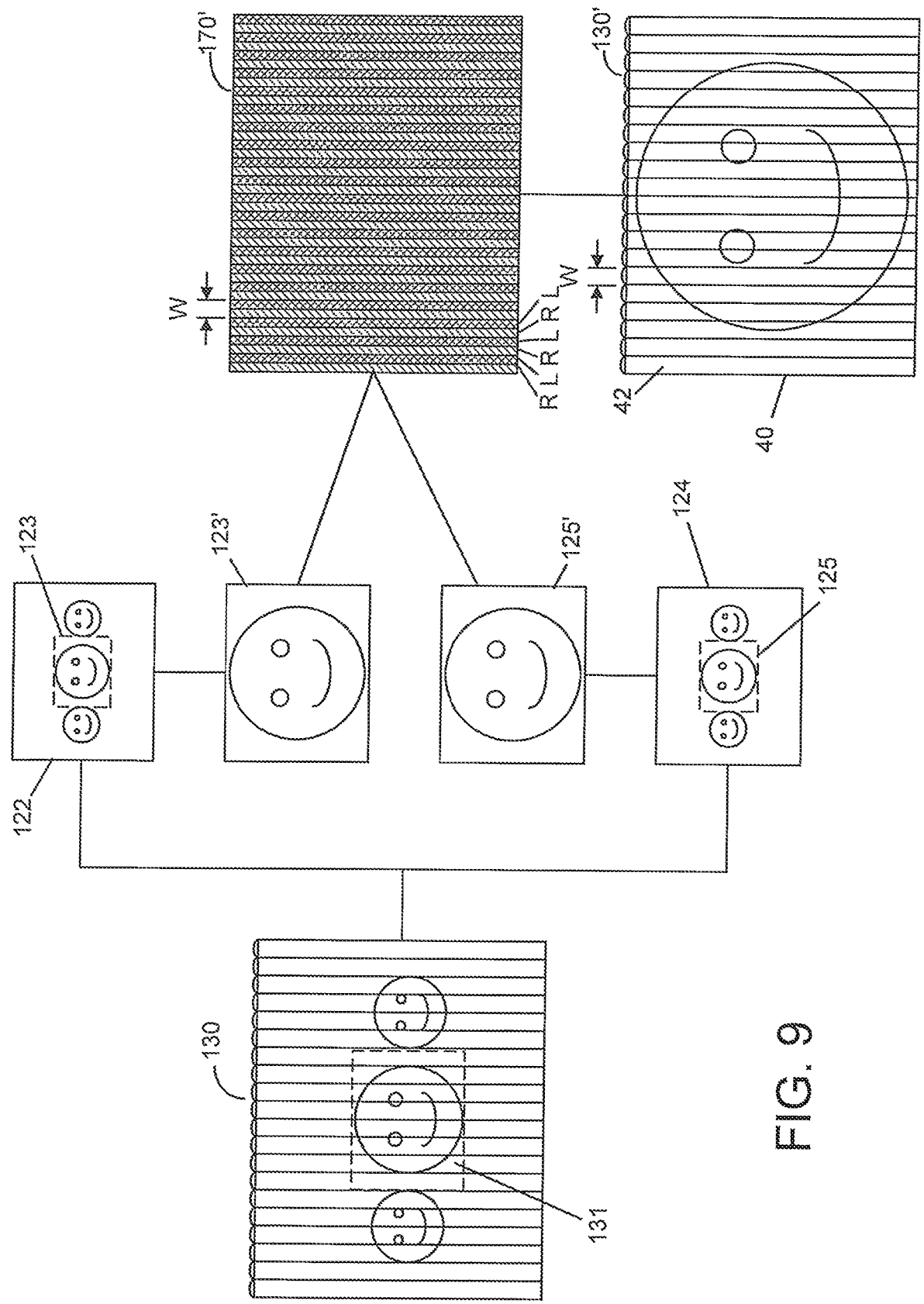

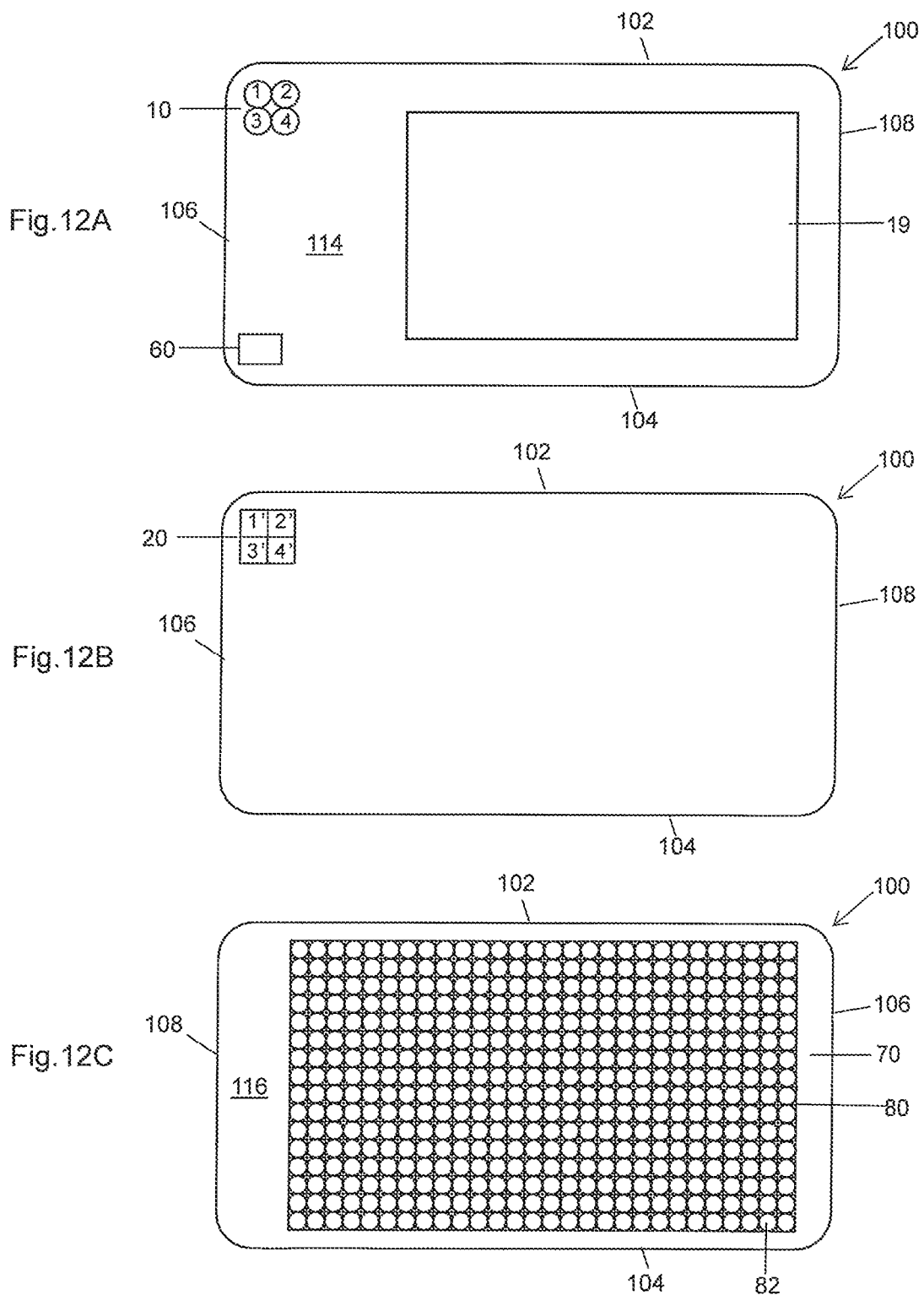

The eyes will see stereo pair images of image 1" 2" from Angle B
The eyes will see stereo pair images of image 3" 4" from Angle A.

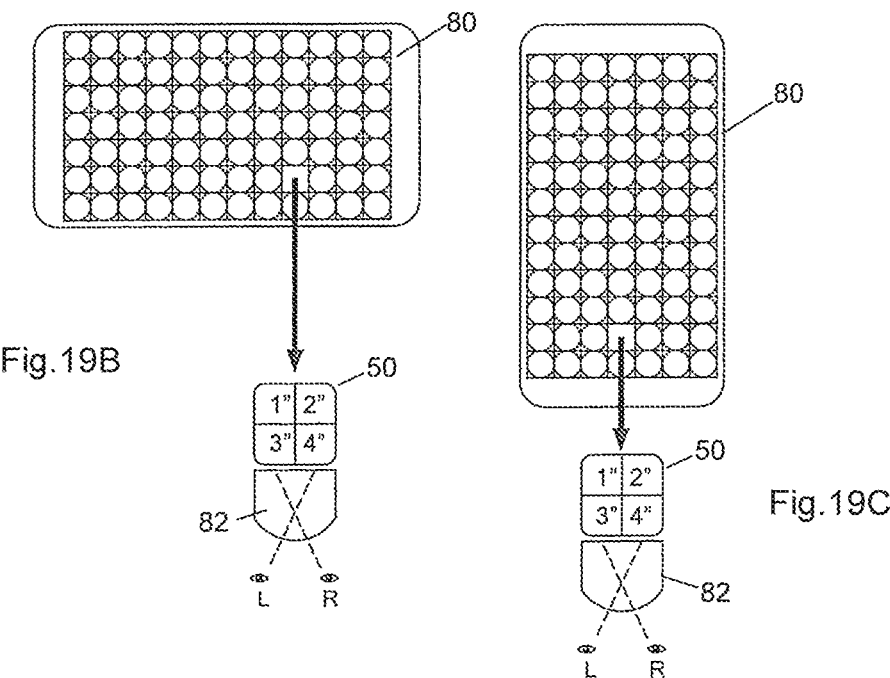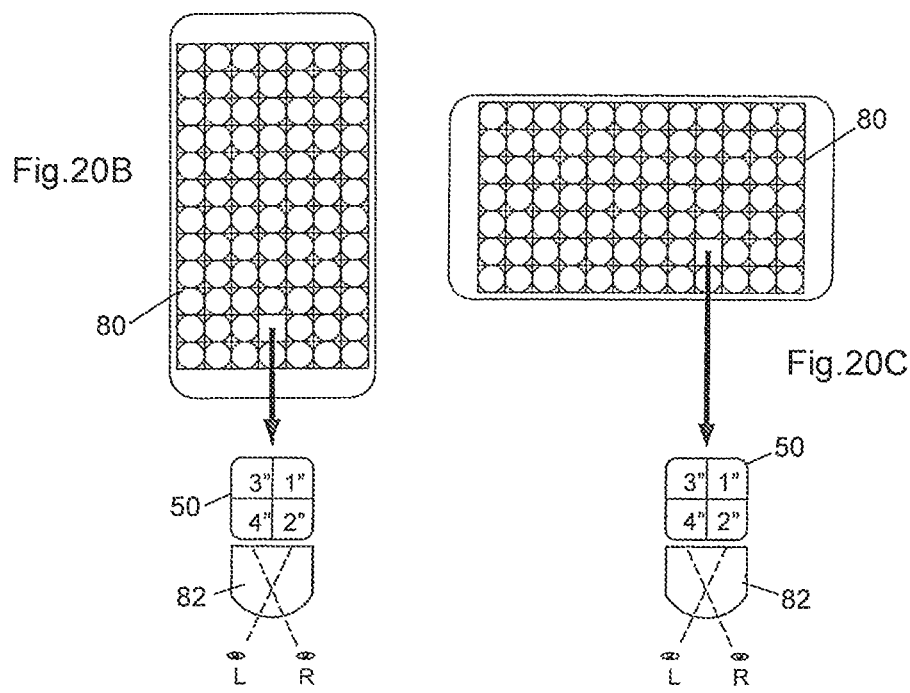

Configuration of camera lens : 2 x 2 to 10 x 10

Lens and image sensor

MOBILE DEVICE HAVING A 3D DISPLAY WITH SELECTABLE MAGNIFICATION

CROSS REFERENCES TO RELATED APPLICATIONS

This application claims the benefits of U.S. Provisional Application No. 61/989,746, filed May 7, 2014; U.S. Provisional Application No. 62/003,210, filed May 27, 2014 and U.S. Provisional Application No. 62/154,786, filed Apr. 30, 2015.

FIELD OF THE INVENTION

The present invention relates generally to a mobile device having a 3D display and, more particularly, to a mobile device wherein the magnification of the image to be displayed on the 3D display can be selected by the user.

BACKGROUND OF THE INVENTION

In a mobile device, such as a mobile phone and a tablet or the like, it is desirable to have a 3D display on which an image can be viewed in 3D. It is desirable that the 3D image can be viewed in a landscape mode or vertically in a portrait mode.

SUMMARY OF THE INVENTION

The present invention is concerned with a mobile device has at least two camera lenses for taking pictures either at a landscape mode or a portrait mode. The mobile device has a plurality of sensors to capture the images formed by the camera lenses, and a processor configured to retrieve signals indicative of the images for composing a composite image. The composite image is conveyed to a display panel so that a viewer can see a 3D image, either in a landscape mode or in a portrait more, through a parallax sheet with parallax separating units. The 3D image can be displayed with a full image or only a portion of the full image.

Thus, one aspect of the present invention is a 3D imaging system for use on a mobile device, comprising:
 a display area configured to display a 3D image, the display area comprising a display panel and a parallax sheet disposed over the display panel, the parallax sheet comprising a plurality of parallax separating units, each parallax separating unit has a unit width; and
 a processor configured to compose a composite image from a plurality of images, said plurality of images comprise a first image and a second image and to convey signals indicative of the composite image to the display panel for displaying a displayed image indicative of the composite image, the display image comprising a plurality of first image strips and second image strips alternately arranged, the first image strips indicative of the first image and the second image strips indicative of the second image, each of the first and second image strips has a strip width substantially equal to one half of the unit width, wherein the parallax sheet is arranged such that each parallax separating unit substantially covers one of the first image strips and one of the second image strips, wherein the 3D imaging system is operable at least in a first display mode and in a second display mode, such that when the 3D image system is operated in the first display mode, the displayed image is indicative of substantially a full image of the first and the second images, and when the 3D image system is operated in the second display mode, the displayed image is indicative of the full image modified by a magnification factor different from 1, and wherein the strip width is substantially the same when the 3D imaging system is operated in the first display mode or in the second display mode.

According to an embodiment of the present invention, each of the parallax separating units has a longitudinal axis, said imaging system further comprising:
 a plurality of camera lenses comprising a first camera lens and a second camera lens arranged in a direction substantially perpendicular to the longitudinal axis and configured to form the first image and the second image; and
 a plurality of sensor areas arranged to capture the first image and the second image, wherein the processor is configured to retrieve signals indicative of the first image and the second image from the image sensor areas for composing the composite image.

According to an embodiment of the present invention, the parallax sheet is selected from a lenticular sheet and a parallax barrier, wherein the lenticular sheet comprises a plurality of lenticules for providing the parallax separating units and the parallax barrier comprises a plurality of substantially opaque strips for providing the parallax separating units.

According to an embodiment of the present invention, each of the parallax separating units has a longitudinal axis, said imaging system further comprising:
 a plurality of camera lenses comprising a first camera lens and a second camera lens and a third camera lens arranged to form the plurality of images, wherein the first and second camera lenses are disposed adjacent to each other in a first direction substantially perpendicular to the longitudinal axis, and the first and third camera lenses are disposed adjacent to each other in a second direction substantially parallel to the longitudinal axis; and
 a plurality of sensor areas configured to capture the plurality of images, wherein the imaging system is operable in a first picture taking mode and a second picture taking mode, and wherein
 when the imaging system is operated in the first picture taking mode, the processor is configured to retrieve from the sensor areas signals indicative of the images formed by the first camera lens and the second camera lens for composing the composite image, and
 when the imaging system is operated in the second picture taking mode, the processor is configured to retrieve from the sensor areas signals indicative of the images formed by the first camera lens and the third camera lens for composing the composite image.

According to an embodiment of the present invention, the imaging system further comprises a plurality of camera lenses arranged in a first direction and a second direction; wherein said plurality of camera lenses comprise at least a first lens, a second lens and a third lens arranged such that the first and second lenses are arranged in a first direction and the first and third lenses are arranged in a second direction;
 a plurality of image sensor areas associated with said plurality of camera lenses, wherein the imaging system is operable in a first picture taking mode and a second picture taking mode, and wherein
 when the imaging system is operated in the first picture taking mode, the first and second lenses are configured to form the first image and the second image, and the image sensor areas associated with the first and second lenses are configured to capture the first image and the second image; and when the imaging system is operated in the second picture taking mode, the first and third lenses are configured to form the first image and the second image, and the image sensor areas associated with the first and third lenses are configured to capture the first image and the second image.

According to an embodiment of the present invention, the parallax sheet comprises a two-dimensional array of lenslets, the array including a plurality of lenslet rows in a first direction and a plurality of lenslet columns in a second direction, said imaging system further comprising:

a plurality of camera lenses comprising a first camera lens, a second camera lens and a third camera lens arranged to form the plurality of images, wherein the first and second camera lenses are disposed adjacent to each other in the first direction, and the first and third camera lenses are disposed adjacent to each other in the second direction;

a plurality of sensor areas configured to capture the plurality of images, wherein the imaging system is operable in a first picture taking mode and a second picture taking mode, and wherein when the image system is operated in the first picture taking mode, the processor is configured to retrieve from the sensor areas signals indicative of the images formed by the first camera lens and the second camera lens for composing the composite image, and each parallax separating unit comprises a lenslet column; and when the image system is operated in the second picture taking mode, the processor is configured to retrieve from the sensor areas signals indicative of the images formed by the first camera lens and the third camera lens for composing the composite image, and each parallax separating unit comprises a lenslet row.

According to an embodiment of the present invention, the parallax sheet comprises a two-dimensional array of lenslets, the array including a plurality of lenslet rows in a first direction and a plurality of lenslet columns in a second direction, said imaging system further comprising:

a first camera lens, a second camera lens, a third camera lens and a fourth lens arranged in a 2×2 array in which the first and second camera lenses are adjacent to each other in a first direction, the third and fourth camera lenses are adjacent to each other in the first direction, the first and third camera lenses are adjacent to each other in a second direction, and the second and fourth camera lenses are adjacent to each other in the second direction; and a plurality of sensor areas configured to capture the plurality of images, wherein the imaging system is operable in a first picture taking mode and a second picture taking mode, and wherein when the image system is operated in the first picture taking mode, the first and third lenses are configured to form a first pair of component images and the second and fourth lenses are configured to form a second pair of component images, such that the first image is composed of the first pair of component images and the second image is composed of the second pair of component images; and when the image system is operated in the second picture taking mode, the third and fourth lenses are configured to form a third pair of component images and the first and second lenses are configured to form a fourth pair of component images, such that the first image is composed of the third pair of component images and the second image is composed of the fourth pair of component images.

According to an embodiment of the present invention, the first picture taking mode is landscape mode and the second picture taking mode is a portrait mode, and wherein when the imaging system is operated in the first picture taking mode, the first direction is substantially a horizontal direction, and the second direction is substantially a vertical direction.

According to an embodiment of the present invention, the plurality of sensor areas comprise a plurality of sensors, including a first sensor associated with the first camera lens for capturing a first component image, a second sensor associated with the second camera lens for capturing a second component image, a third sensor associated with the third camera lens for capturing a fourth component image, and a fourth sensor associated with the fourth camera lens for capturing a fourth component image, and each of the sensors comprises an array of sensor segments for capturing a part of the corresponding component image, and wherein the displayed image on the display panel comprises a plurality of display units, each display unit associated with a lenslet, each display unit comprising a first display element, a second display element, a third display element and a fourth display element arrange in a 2×2 array in which the first and second display elements are adjacent to each other in the first direction, the third and fourth display elements are adjacent to each other in the first direction, the first and third display elements are adjacent to each other in the second direction and the second and fourth display elements are adjacent to each other in the second direction such that the composite image comprises image contents in the first, second, third and fourth display elements are indicative of signals from a sensor segment in the first sensor, a sensor segment in the second sensor, a sensor segment in the third sensor and a sensor segment in the fourth sensor.

According to an embodiment of the present invention, the displayed image is arranged to be viewed in a first viewing position or in a second viewing position, and wherein each sensor segment comprises a plurality of pixels, and wherein the plurality of display units are arranged in an N by M array, with N and M being positive integers, and the display area is configured for viewing in a first viewing position or in a second viewing position, and when the display area is configured for viewing in the first viewing position, the plurality of pixels in the sensor segment comprises an N by M pixel array, and when the display area is configured for viewing in the second viewing position, the plurality of pixels in the sensor segment comprises an M by N pixel array.

According to an embodiment of the present invention, the imaging system has an orientation sensor configured to determine whether the imaging system is operated in the first picture taking mode or in the second picture taking mode.

According to an embodiment of the present invention, when the magnification factor is greater than 1, the displayed image is indicative of only a part of the full image, and when the magnification factor is smaller than 1, the displayed image is indicative a reduced size of the full image.

Another aspect of the present invention is a method for use in a 3D imaging system. The method comprises:

modifying the first image and the second image into a first modified image and a second modified image by a magnification factor;

electronically dividing the first modified image into N first image strips and dividing the second modified image into N second image strips;

electronically compressing each of the image strips by a factor of 2 into a compressed image strip;

electronically arranging the N first compressed image strips and the N second compressed image strips in an interlace manner to form an interlaced image; and conveying signals indicative of the interlaced image to the display panel based on the magnification factor, wherein N is a positive number greater than 10.

Yet another aspect of the present invention is a mobile device, comprising:

a 3D imaging system;

a plurality of camera lenses for forming the plurality of images; and a plurality of sensor areas arranged to capture the plurality of images, the sensor areas configured to provide signals to the processor indicative of the plurality of images.

According to an embodiment of the present invention, the display area is also configured to display information.

According to an embodiment of the present invention, the display area configured to display the 3D image is disposed on a first side of the mobile device, and an information display area disposed on a second side of the mobile device.

According to an embodiment of the present invention, the mobile device also has an apparatus associated with the display area such that when the 3D imaging system is operated in the first mode, the apparatus is configured to allow a user to a selected portion of the displayed image in order to change the magnification factor.

According to an embodiment of the present invention, the mobile device also has an apparatus associated with the display area such that when the 3D imaging system is operated in the first mode, the apparatus is configured to allow a user to select the magnification factor.

The present invention will become apparent upon reading the description taken in conjunction with FIGS. 1 to 23B.

BRIEF DESCRIPTION OF THE DRAWINGS

FIG. 3 shows a lenticular screen associated with the image display area.

FIG. 4 shows a section of the lenticular screen and the associated display panel.

FIG. 5 illustrates a 3D display in a default mode.

FIG. 6 illustrates a 3D display in an enlargement mode.

FIG. 7 illustrates the process of producing a 3D display image in a default mode.

FIG. 9 illustrates the process of producing a 3D display image in an enlargement mode.

FIG. 12A shows a front view of a mobile device having a 2×2 camera lens arrays.

FIG. 12B is a schematic view of the interior of the mobile device showing an image sensor array associated with the camera lens array.

FIG. 12C shows a back view of the mobile device.

FIG. 19B shows viewing the image horizontally with an image taken horizontally.

FIG. 19C shows viewing the image vertically with an image taken horizontally.

FIG. 20B shows viewing the image vertically with an image taken vertically.

FIG. 20C shows viewing the image horizontally with an image taken vertically.

DETAILED DESCRIPTION OF THE INVENTION

Figure 1:
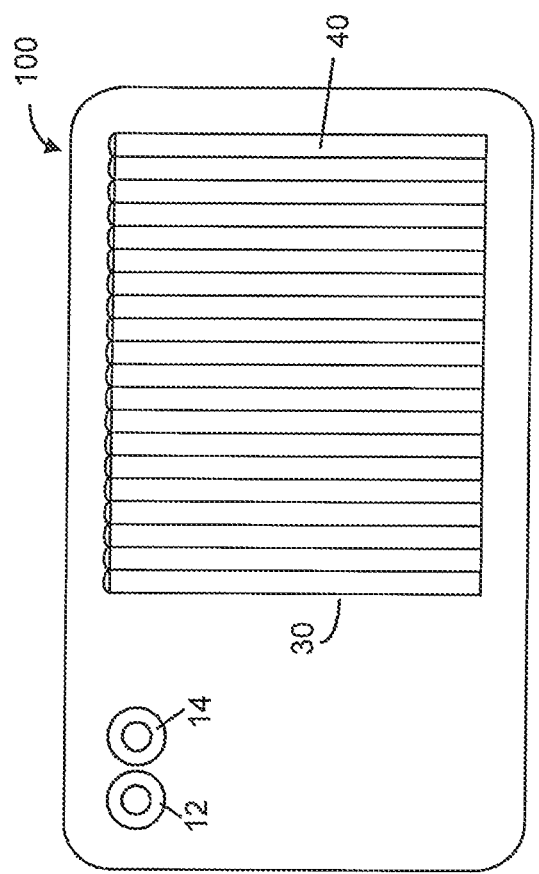
FIG. 1 shows a mobile device with two camera lenses and an image display area, according to an embodiment of the present invention.
Figure 1A:
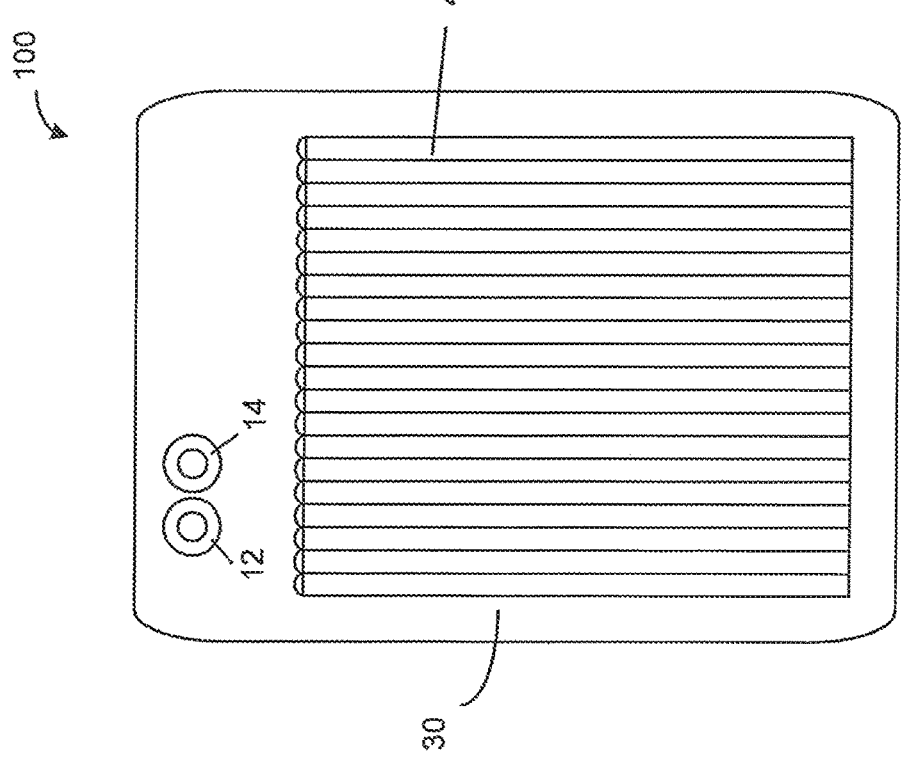
FIG. 1A shows a mobile device with two camera lenses and an image display area, according to another embodiment of the present invention.

The present invention is concerned with a method and apparatus for producing a 3D image to be displayed on a mobile device, such as a mobile phone, a tablet or the like. Thus, the mobile device is configured to have a 3D display and necessary electronic processor to produce an image to be shown in 3D. For convenience, the mobile device has a plurality of camera lenses to take pictures and associated image sensors to capture the images formed by the camera lenses. FIG. 1 shows a mobile device with two camera lenses and an image display area, according to an embodiment of the present invention. As shown, the mobile device 100 has an image display area 30 overlaid with a parallax sheet, such as a parallax barrier or a lenticular screen 40. As known in the art, a parallax barrier or a lenticular screen allows the left eye and the right eye of a viewer to separately see a left view and a right view of the displayed image on the display area (see FIGS. 8 and 8A). A lenticular screen has a plurality of lenticules each of which is a cylindrical lens having a longitudinal axis (see FIGS. 3 and 4). The mobile device 100 also has a plurality of lenses to take pictures of a scene from a plurality of vintage points. For example, the mobile device 100 has two camera lenses 12, 14 to take pictures of a scene from two viewing angles. The camera lenses 12, 14 can be located on the same side of the image display area 30 or on the opposite side. In one embodiment of the present invention, the lenticular screen 40 of the image display area 30 is arranged such that the longitudinal axis of the lenticules is substantially in the vertical direction when the mobile device 100 is held in a horizontal position as shown in FIG. 1. However, the orientation of lenticular screen 40 and the arrangement of the camera lenses can be done differently as shown in FIG. 1A.

Figure 2:
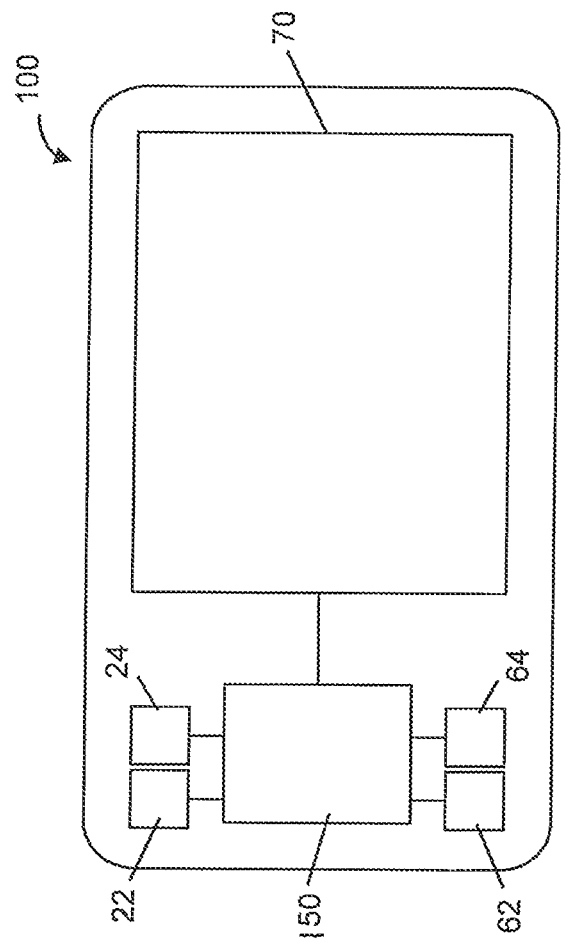
FIG. 2 shows the image sensors associated with the camera lenses and the display panel associated with the image display area.

FIG. 2 shows the image sensors associated with the camera lenses and the display panel associated with the image display area in a mobile device as shown in FIG. 1. As shown in FIG. 2, the mobile device 100 has two image sensors or sensor areas 22, 24 configured to capture the images taken by the camera lenses 12, 14 (FIG. 1). The mobile device 100 has an electronic processor 150 configured to process the image content in the image sensors for displaying on a display panel 70 which is located behind the lenticular screen 40 (see FIG. 4). The mobile device 100 also has necessary electronic memory to store images. As shown in FIG. 2, the mobile device 100 has a memory unit 62 and a memory unit 64 for store image content of a pair of images for producing a 3D image, for example. With the memory units 62, 64, images of a stereo-pair can also be downloaded into the mobile device 100 from an external source. The electronic processor 150 is configured to combine the image content in the image sensors 22, 24 or in the memory units 62, 64 into a composite image (see FIGS. 7, 9 and 9A) to be displayed on the display panel 70).

FIG. 3 shows a typical lenticular screen. As shown in FIG. 3, the lenticular screen 40 has a row of lenticules 42 arranged next to each others along the longitudinal axis of the lenticules. The lenticular screen 40 is arranged on top of the display panel 70 as shown in FIG. 4. Each of the lenticules has a lenticule width W.

In one embodiment of the present invention, the 3D display function of the mobile device 100 can have two modes: a default mode and an enlargement mode. In the default mode, the 3D image as displayed on the image display area 30 is substantially a full view of the two images taken by the camera lenses 12, 14. As shown in FIG. 5, the image 122 and image 124 as taken by the camera lenses 12, 14 and captured in image sensors 22, 24 (or stored in the memory units 62, 64) are combined to be shown as a 3D image 130. In the enlargement mode, corresponding parts of the images 122, 124 are enlarged such that the 3D image as displayed on the image area 30 represents a selected part of images 122, 124. As shown in FIG. 6, only the corresponding parts 123, 125 of images 122, 124 are combined to be shown as a 3D image 130'.

Figure 8:
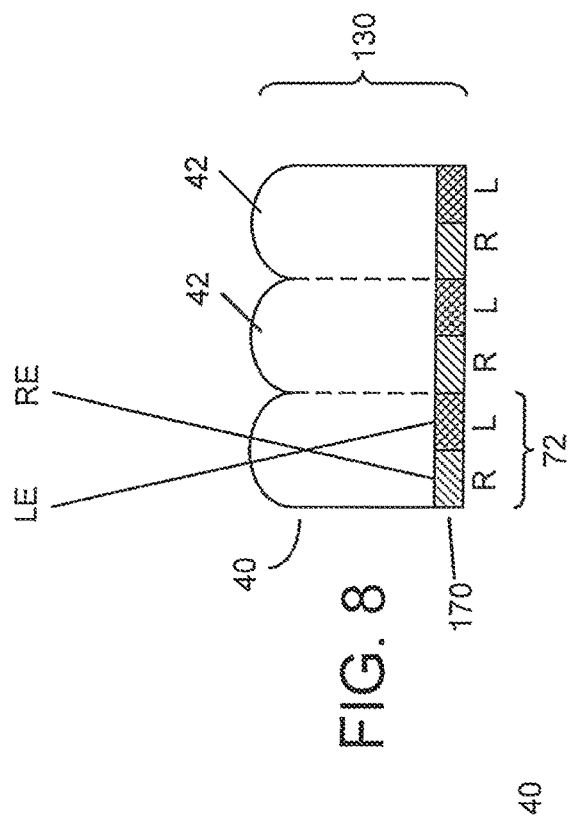
FIG. 8 shows a section of the lenticular screen and part of a composite image displayed on the display panel.

For illustration purposes only, if the lenticular screen 40 on the image display area 30 (see FIG. 1) has a row of N lenticules with each lenticule having a width W, then the display area of the display panel 70 is also divided into N area strips 72 of width W as shown in FIG. 4. Each of the images 122 and 124 is also divided into N image strips and each of the N image strips are compressed by a factor of 2. Let us call image 122 a left image and image 124 a right image. The N compressed image strips of the left image and the N compressed image strips of the right image are arranged in an interlaced manner to form an interlaced image. The interlaced image, when conveyed to the display panel 70, is presented as a composite image 170 (see FIG. 7). The composite image to be displayed on the display panel 70 is composed such that one area strip 72 contains the image content of one image strip from the left image and the image content of one image strip from the right image as shown in FIG. 8. Through the lenticular screen 40, the left eye (LE) of a viewer would see the image content of the left image and the right eye (RE) would see the image content of the right image. If the left image and the right image are images of the same scene taken at different angles, the image 130 as seen by the viewer is a 3D image. The compression of the N image strips of the left and right images is for reserving the aspect ratio of the images 122, 124 when the composite image 170 is displayed.

Thus, the process of producing a 3D image 130 on the image area 30 (FIG. 1) as shown in FIG. 7 can be summarized as a composing step and a display step as follows:

The composing step comprises dividing each of images 122, 124 into N image strips; compressing each of the image strips by a factor of 2; and arranging the image contents of the N compressed image strips in image 122 and the image contents of the N compressed image strips in image 124 in an interlace manner to form an interlaced image.

The display step comprises conveying the interlaced image to the display panel 70 to be displayed as a composite image 170, such that an adjacent image pair in the composite image 170 is located substantially under a lenticule 42 of the lenticular screen 40.

When the 3D display function is selected as an enlargement mode, the viewer is allowed to select a portion of the displayed image to be enlarged. In one embodiment of the present invention, on the displayed image 130, a view is allowed to select a portion 131 to be enlarged. The selection can be accomplished by one of a number of different ways with different forms of apparatus. On a touch screen, the viewer can use one or two fingers to identify the selected portion. For example, when the display panel shows a displayed image 130 such as shown in FIG. 5, the viewer can use or more fingers to enlarge the displayed image until the display panel shows the desired enlarged portion such as the displayed image 130' shown in FIG. 6. Alternatively, the viewer can use a cursor, stylus or a light pen to define the selected area. As shown in FIG. 9, after the viewer has selected a portion 131 of the displayed image 130 to be enlarged, the processor 150 (FIG. 2) is configured to identify the corresponding portions 123, 125 on images 122, 124. The only the portions 123, 125 will be used to compose an interlaced image. Thus, each of the image portions 123, 125 is divided into N image strips and the image strips of the image portions 123, 125 are, after compression, arranged in an interlaced manner to form the interlaced image. Equivalently, the image portion 123 and the image portion 125 are enlarged as enlarged image 123' and enlarged image 125', and the enlarged images 123', 125' are turned into a composite image 170' and then the 3D display image 130', similar to the process as described in reference to FIG. 7.

Thus, the process of producing a 3D image 130' as shown in FIG. 9 can be summarized as a pre-processing step, a composing step and a display step as follows:

The pre-processing step comprises selecting an image portion to be enlarged and retrieving the corresponding image portions 123, 125 of the images 122, 124.

The composing step comprises dividing each of image portions 123, 125 into N image strips; and arranging the image contents of the N compressed image strips in image 123 and the image contents of the N compressed image strips in image 125 in an interlace manner to form an interlaced image.

The display step comprises conveying the interlaced image to the display panel 70 to be displayed as a composite image 170', such that an adjacent image pair in the composite image 170' is located substantially under a lenticule 42 of the lenticular screen 40.

Equivalently, the composing step comprises enlarging the image portions 123, 125 to obtain enlarged images portions 123', 125', dividing each of enlarged image portions 123', 125' into N image strips; and arranging the image contents of the N image strips in image 123' and the image contents of the N image strips in image 125' in an interlace manner to form an interlaced image.

It should be noted that the integer N is related to the number of lenticules on the portion of the lenticular screen that is used for viewing the 3D image. Depending on the resolution of the display panel, N can be ranged from 100-1000, but N can be smaller than 100 or larger than 1000.

Figure 9A:
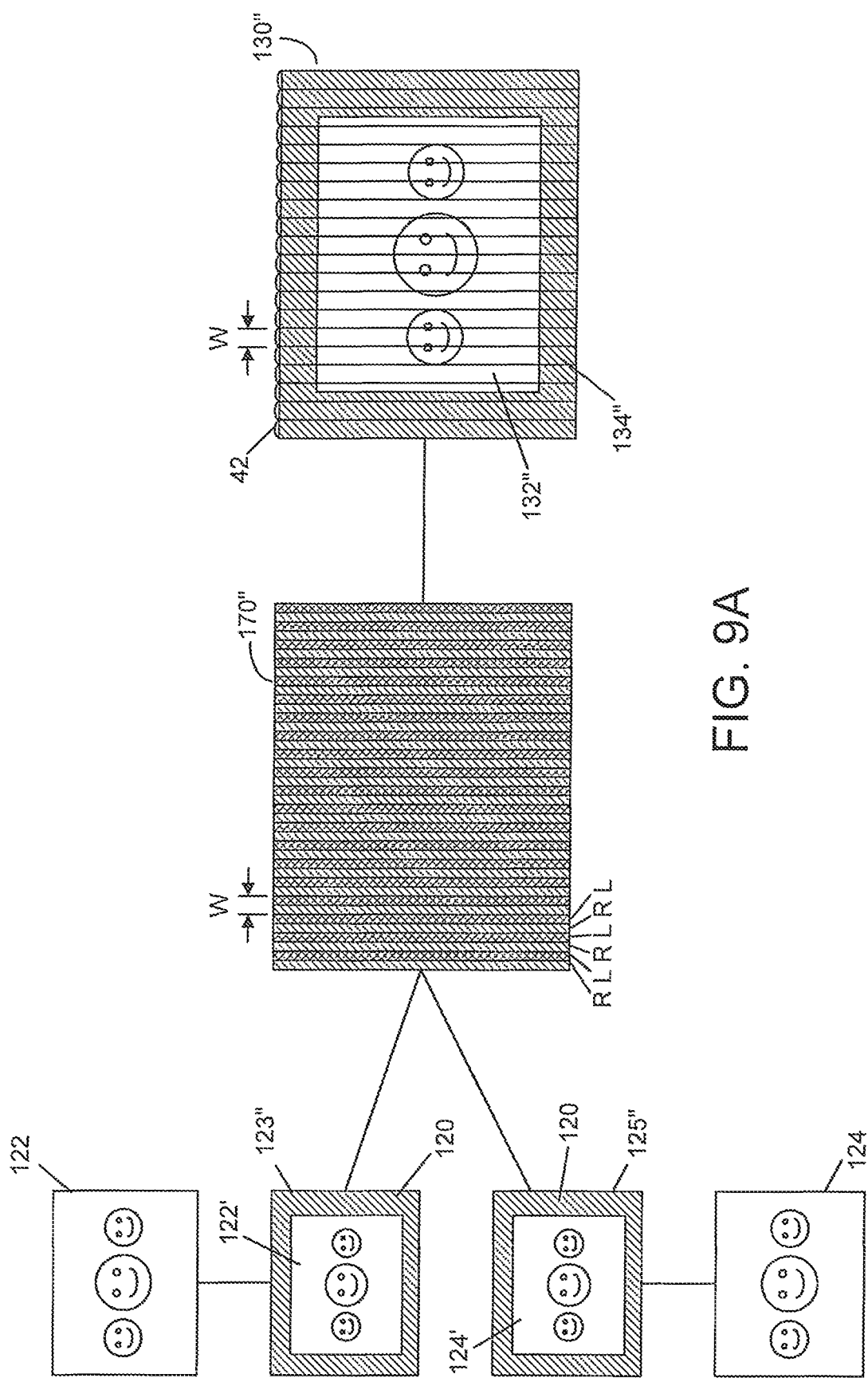
FIG. 9A illustrates the process of producing a 3D display image in a reduction mode.

In another embodiment of the present invention, the 3D display function also includes a reduction mode wherein the viewer is allowed to reduce a 3D image from a full view to a smaller view. As shown in FIG. 9A, the left and right images 122, 124 can be reduced to a pair of smaller images 122', 124' so that the displayed image 130" in the display area 30 is smaller than the lenticular screen 40 and the underlying display panel 70. As shown in FIG. 9A, the displayed image 130" includes a reduced 3D image 132" and a background image part 134". The background image part 134" can be a frame-like background with one or more colors or patterns. In order to produce the displayed image 130", the left and right images are reduced to become reduced left and right images 122' and 124' to be combined with a background part 120. The combined left and right images 123", 125" are then used to compose an interlaced image 170" with R, L image strips alternately arranged.

In the embodiments as shown in the drawings, a lenticular screen 40 having a plurality of lenticules is used to separate the L, R image strips so that the left eye and the right eye of a viewer can view the corresponding L, R images 122, 124, for example. It is understood by one of ordinary skill in the art that a lenticular screen, such as the screen 40, is one type of parallax sheet. Another type parallax sheet such as a parallax barrier 41 having a plurality of opaque strips 43 can also be to separate the L, R image strips for the same viewing purposes (see FIG. 8A). Therefore, the terms "lenticular screen" and "parallax barrier" may be used interchangeably throughout the specification.

Furthermore, the display panel 70 can be a liquid crystal display (LCD) panel, an organic light-emitting diode (OLED) display panel or the like.

Figure 10A:
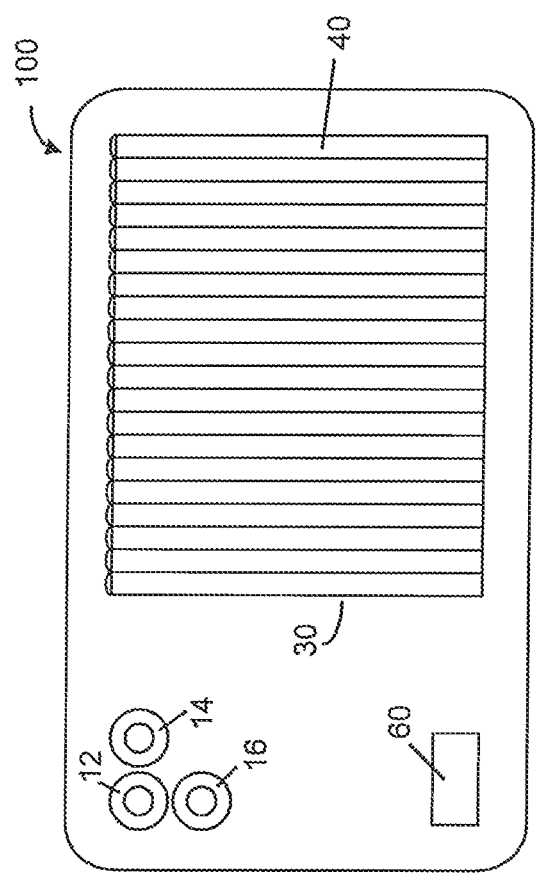
FIG. 10A shows a different embodiment of the present invention wherein the mobile device has three camera lenses arranged in an L-shape configuration.
Figure 10B:
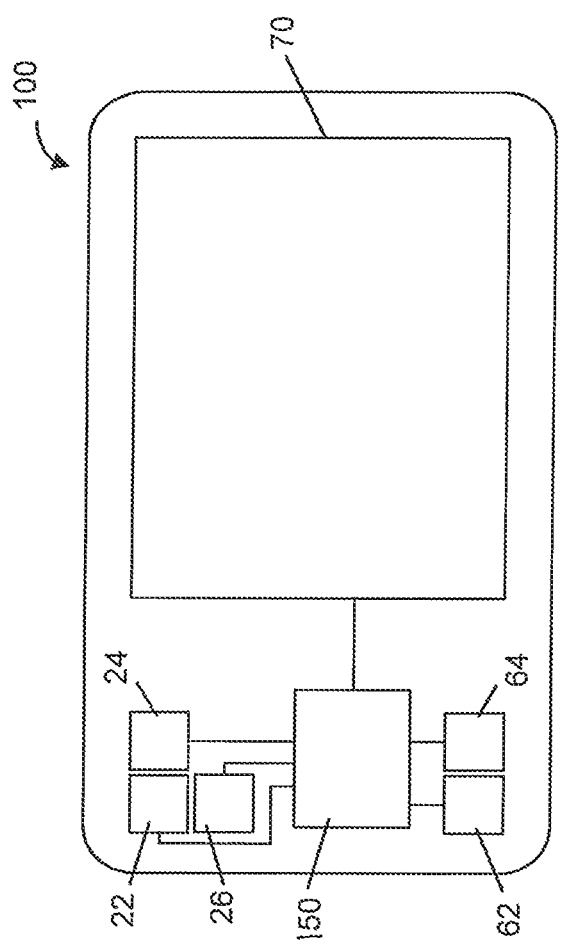
FIG. 10B shows the image sensors associated with the three camera lenses and the display panel associated with the image display area.

In a different embodiment of the present invention, the mobile device has three camera lenses arranged in an L-shape configuration. As shown in FIG. 10A, the mobile device 100 has three camera lenses 12, 14 and 16. Whereas camera lenses 12, 14 are arranged in a first direction substantially perpendicular to the longitudinal axis of the lenticules 42 (see FIGS. 3 and 4), the camera lens 16 is arranged such that it is separated from camera lens 12 in a second direction substantially perpendicular to the first direction. As shown in FIG. 10B, the mobile device also has three image sensors or sensor areas 22, 24 and 26 configured to capture the image taken by the associated camera lenses 12, 14 and 16. As such, the user can take pictures in a horizontal direction or in a vertical direction. The mobile device 100 also has an orientation sensor 60 configured to determine whether the user is taking pictures in the horizontal direction or in the vertical direction. If the user is taking pictures in the horizontal direction, only the images captured through camera lenses 12 and 14 are used for composing the composite image. If the user is taking pictures in the vertical direction, only the images captured through camera lenses 12 and 16 are used for composing the composite image.

It is understand that an image sensor has a plurality of sensor pixels arranged in rows and columns and a display panel also has a plurality of pixel elements arranged in rows and columns. The number of columns of sensor pixels on the image sensors 22, 24 and the number of columns of pixel elements on the display panel 70 may be the same or different. Furthermore, the aspect ratio of the image sensor and the aspect ratio of the display panel may not be the same. In order to make full use of the display panel, it is desirable to select a portion of the image sensors so that the image content of the selected portion on the left and right images can be used to compose a composite image to match the display panel. It is desirable that the width of the lenticules can cover 2M columns of the display panel, wherein M is a positive integer. If M=1, then each of the columns of the pixel elements is used to display on compressed image strip. If M=2, then two columns of the pixel elements is used to display on compressed image strip and so on.

Figure 11A:
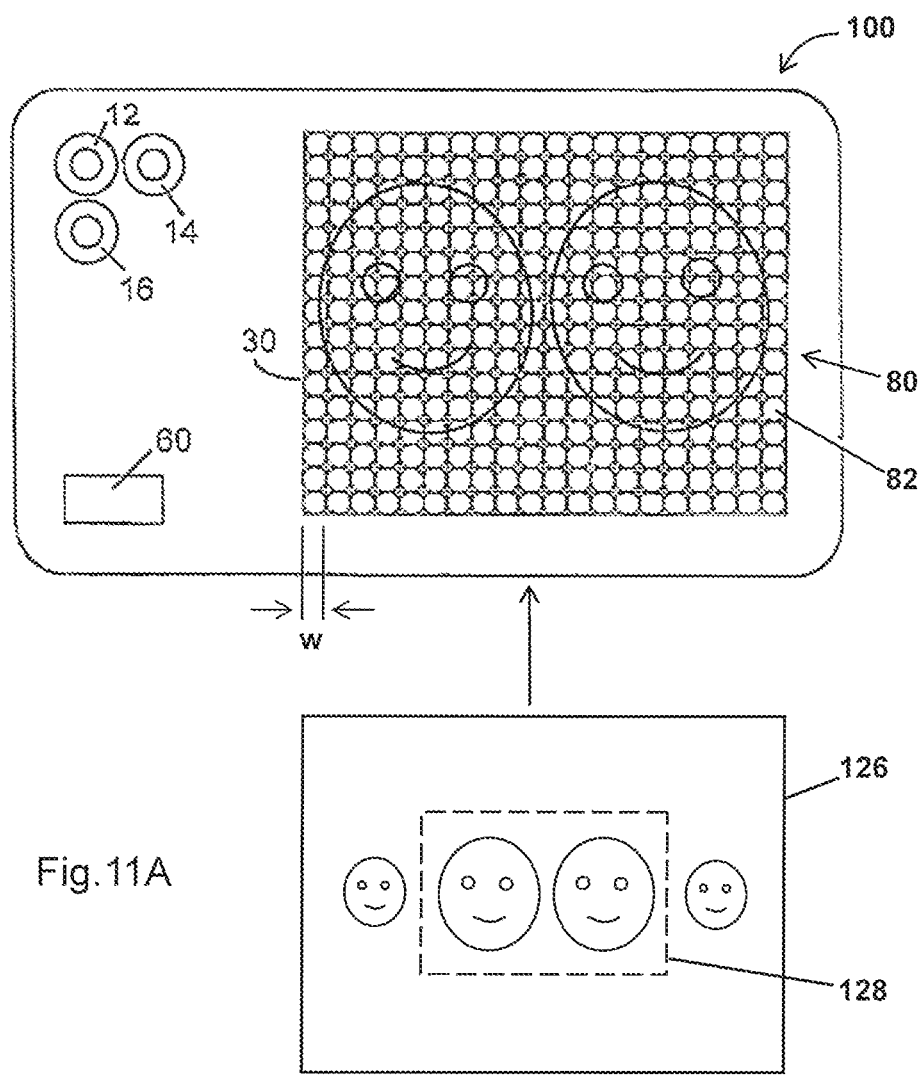
FIG. 11A shows another embodiment of the present invention wherein the mobile device has a lenslet array arranged to display a 3D image in a landscape mode.
Figure 11B:
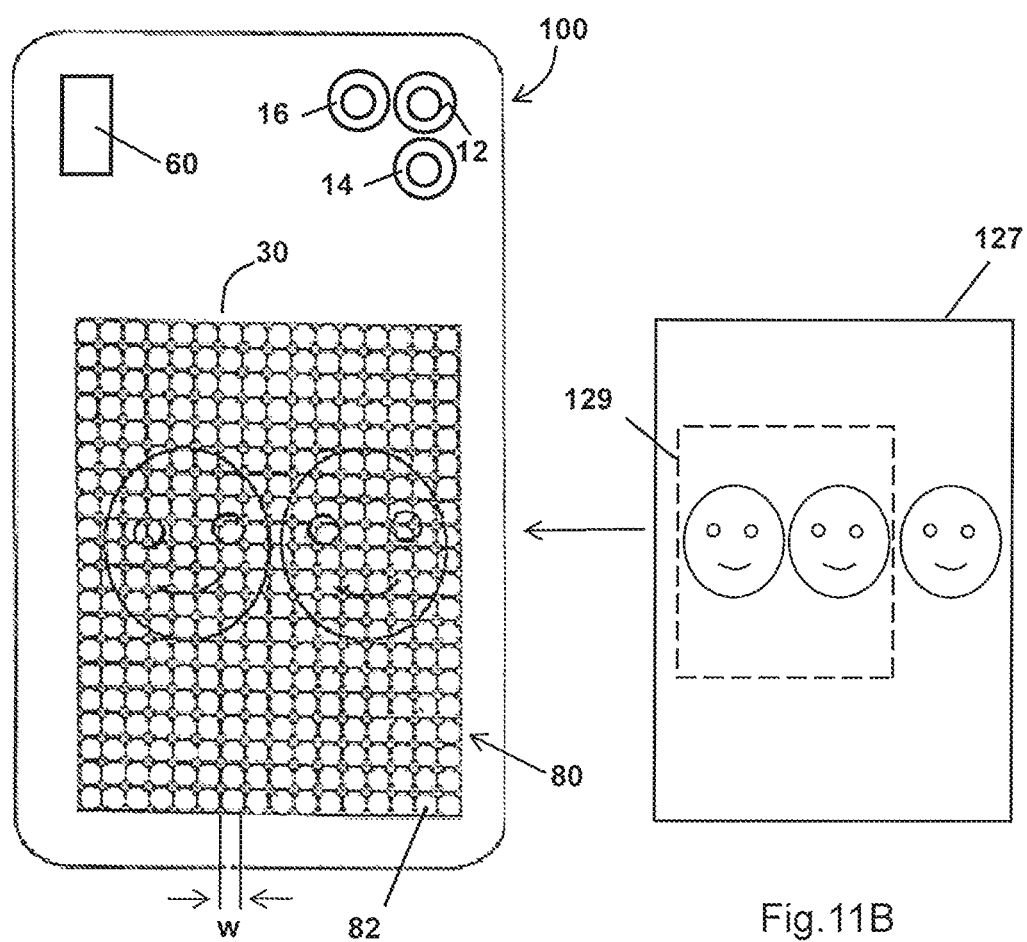
FIG. 11B shows the camera of FIG. 11A wherein the mobile device is arranged to display 3D image in a portrait mode.

In yet another embodiment, the mobile device 100 has a lenslet sheet 80 with a two dimensional array of lenslets 82 on the display area 30. The mobile device can be arranged to display a 3D image on the display area 30 in a landscape mode (horizontal position) or in a portrait mode. The entire frame of a 3D scene 126 can be displayed on the display area 30, or only a section 128 of the same 3D scene is displayed in the landscape mode with a greater magnification factor as shown in FIG. 11A. Likewise, the entire frame of a 3D scene 127 can be displayed on the display area 30 or only a section 129 of the same 3D scene is displayed in the portrait mode with a greater magnification factor as shown in FIG. 11B. It is understood that the 3D scene 126 is composed from two images taken by lenses 12 and 14 and the 3D scene 127 is composed from two images taken by lenses 12 and 16, for example.

FIG. 12A shows a mobile device according one embodiment of the present invention. As shown in FIG. 12A, the mobile device 100 has four edges: first edge 102, second edge 104, third edge 106 and fourth edge 108. The mobile device 100 has a first side 114 with an information display area 14. The information display area 14 can be used to display a plurality of icons, for example, so as to allow a user to choose what to do with the mobile device. The user may choose to read or write an email on the information display area 14, for example. The mobile device 100 has a camera lens array 10 with four lenses (1, 2, 3, 4) for simultaneously taking a 3D picture of an object. The images formed by the four lenses are recorded or captured by a sensor array 20 composed of four sensor sub-areas or four image sensors (1', 2', 3', 4') as shown in FIG. 12B. FIG. 12C shows the second side 116 of the mobile device 100. The second side 116 of the mobile device 100 has an image display area 26 configured to display a 3D image. As can be seen in FIGS. 19B, 19C, 20B and 20C, the 3D image can be viewed in a vertical position or a horizontal position. The mobile device 100 has an orientation sensor 60 which can be used to select the orientation of the 3D image so that the 3D image can be viewed in a vertical position or a horizontal position, for example.

Figure 13:
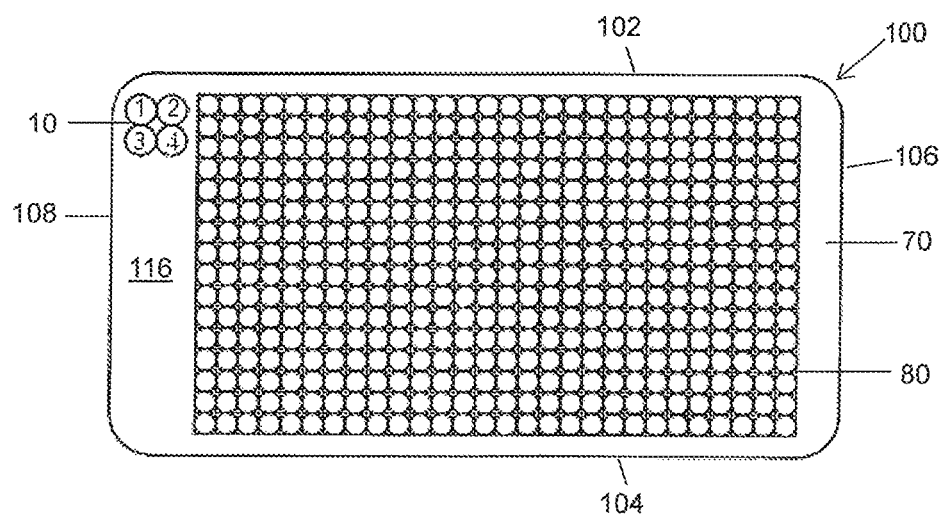
FIG. 13 shows a different embodiment of the present invention.

According to a different embodiment of the present invention, the camera lens array 10 is located on the second side 116 of the mobile device 100 as shown in FIG. 13. As such, when the user is taking a 3D picture of an object or people in front of the user, the scene being photographed as viewed by one of the lenses in the camera array 10 can be displayed on the information display area 14 on the first side. In yet another embodiment of the present invention, each of the sides 114 and 116 of the mobile device 100 has a camera lens array 10.

Figure 15:
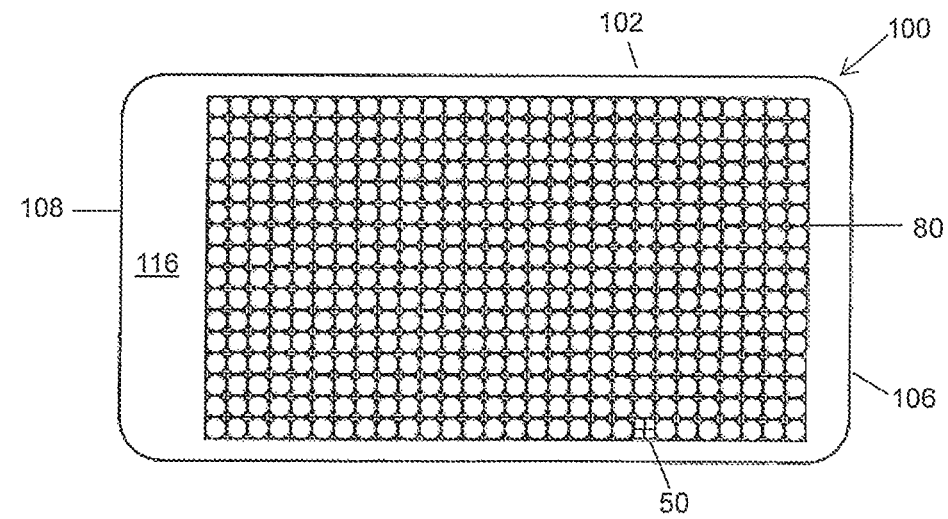
FIG. 15 is a schematic view showing a display unit associated with each lenslet.
Figure 14A:
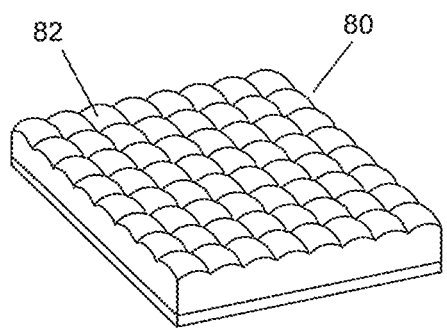
FIG. 14A is an isometric view of a lenslet array and an image display.
Figure 14B:
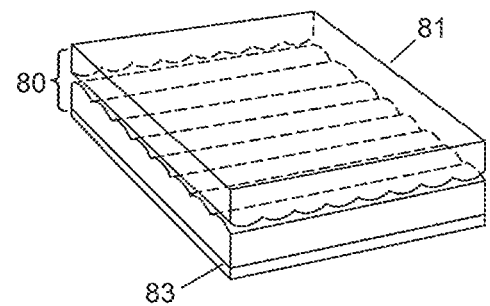
FIG. 14B is an isometric view of a lenslet array, according to a different embodiment of the present invention.
Figure 16A:
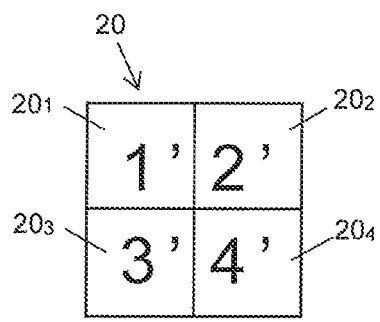
FIG. 16A shows an image sensor array of four sensors.
Figure 16B:
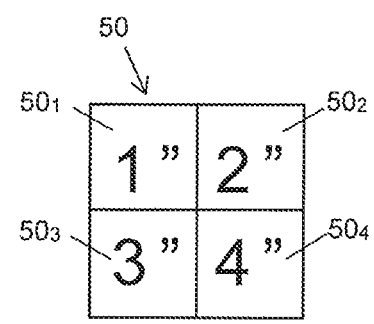
FIG. 16B shows a display unit having four display elements.
Figure 17:
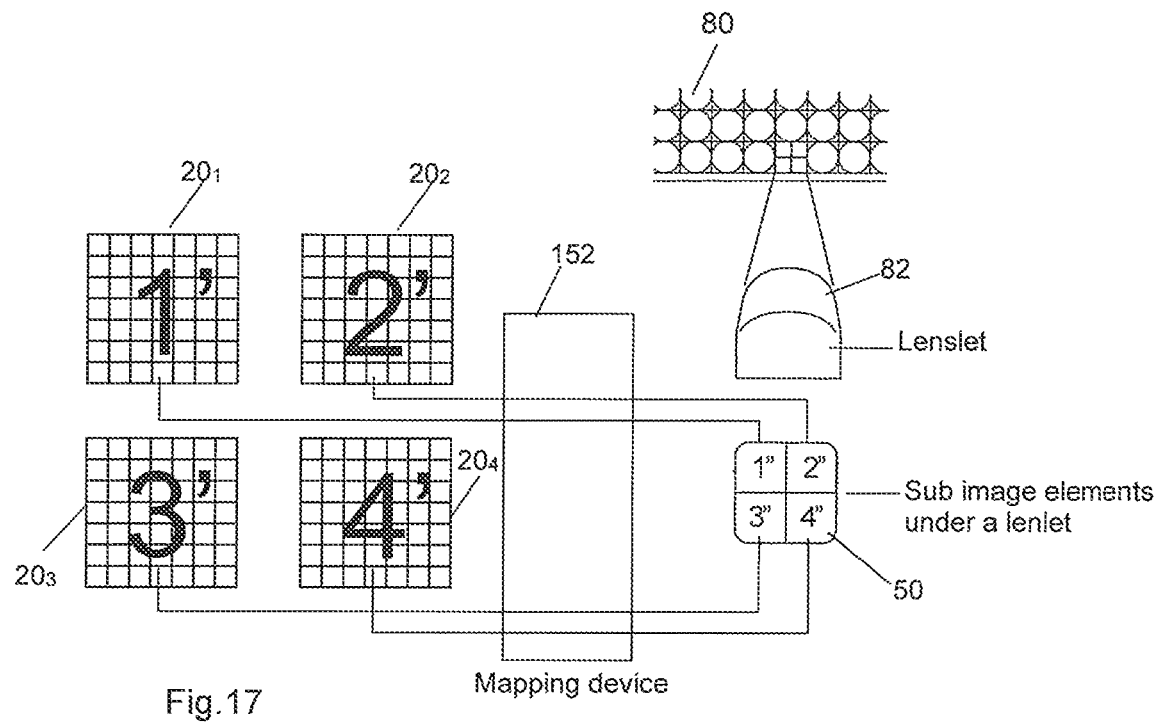
FIG. 17 shows the connection between the image sensors and the display elements in a display unit.
Figure 18:
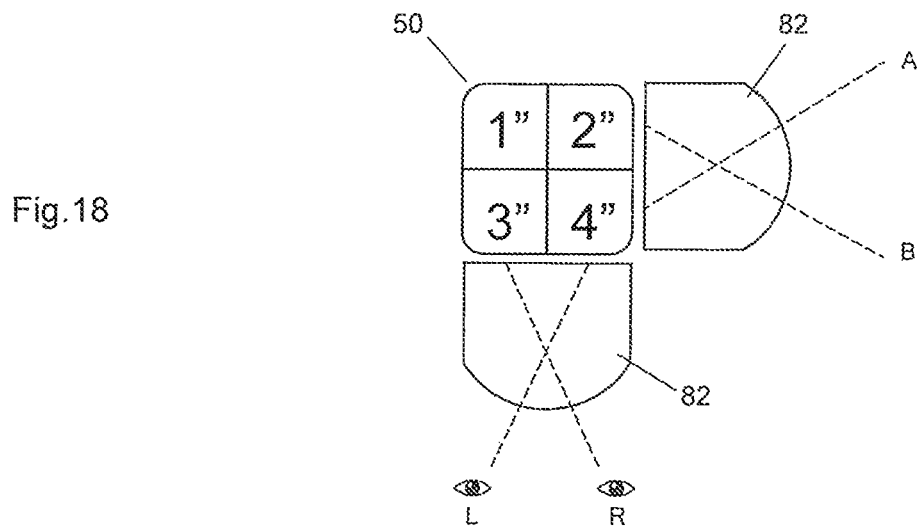
FIG. 18 illustrates the formation of stereo images.

As shown in FIGS. 12C and 13, the image display area 70 has a sheet of lenslets 80 which contains a two-dimensional array of lenslets 82 as shown in FIG. 14A. In a different embodiment, the lenslet array is made of two lenticular screens 81, 83 stacked on top of each other face-to-face with the lenticules of one screen being perpendicular to the lenticules of the other screen, as shown in FIG. 14B. As shown in FIGS. 14A and 14B, the lenslet array 80 is placed on top of a display area or panel 70. The displayed image in the display area 70 has a plurality of display units 50, each of which is composed of four display elements as shown in FIG. 15. The arrangement of the four display elements ($50_1$, $50_2$, $50_3$, $50_4$) in each of the display units 50 is shown in FIG. 16B. As shown in FIG. 16B, the display elements ($50_1$, $50_2$, $50_3$, $50_4$) are used to display the image information indicative of the sensed signal in the pixels of the image sensors (1', 2', 3', 4') in the sensor array 20. As shown in FIG. 16A, the sensor array 20 has four sensor sub-areas or four image sensors (1', 2', 3', 4') denoted as $20_1$, $20_2$, $20_3$, $20_4$. It is understood that each of the image sensors $20_1$, $20_2$, $20_3$, $20_4$ has a plurality of pixels arranged in a two-dimensional array as shown in FIG. 17. As shown in FIGS. 16A, 16B and 17, the sensed signal in a pixel in the image sensor $20_1$ is displayed in the display element $50_1$ as image element 1"; the sensed signal in a pixel in the image sensor $20_2$ is displayed in the display element $50_2$ as image element 2"; the sensed signal in a pixel in the image sensor $20_3$ is displayed in the display element $50_3$ as image element 3"; and the sensed signal in a pixel in the image sensor $20_4$ is displayed in the display element $50_4$ as image element 4". In order to convey the sensed signals from the pixels in the image sensor array 20 to the display elements in the display units of image display 70, a mapping device or processor 152 having sufficient memory may be used. The mapping device or processor 152 can be part of the electronic processor 150.

Figure 19A:
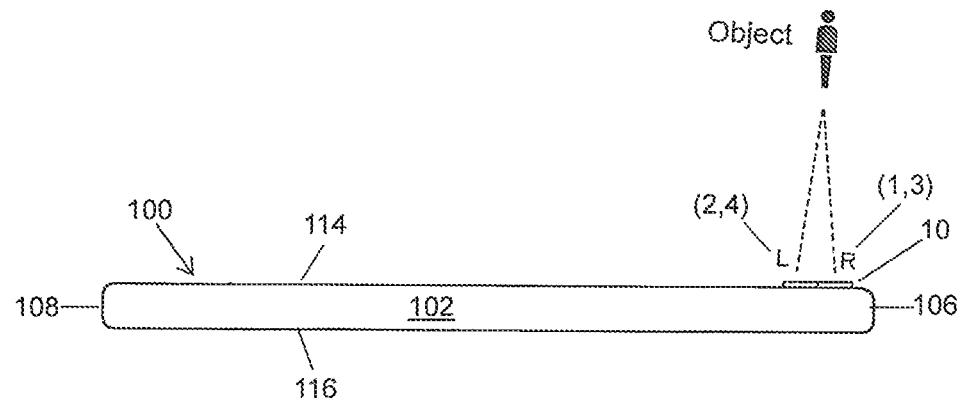
FIG. 19A shows picturing taking while holding the mobile device horizontally.
Figure 20A:
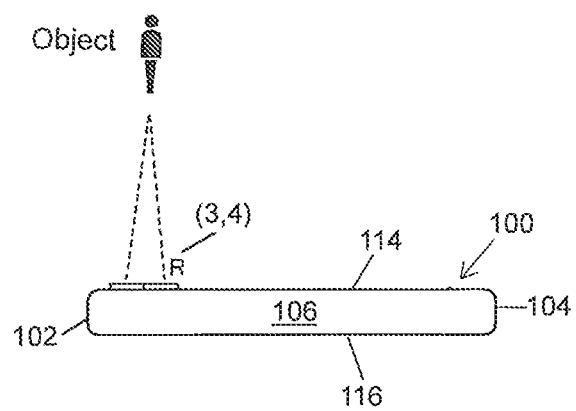
FIG. 20A shows picturing taking while holding the mobile device vertically.

It should be noted that, with the mapping as illustrated in FIG. 17, a viewer's left and right eyes will see the correct left and right stereoscopic pairs regardless whether the user takes a picture in a landscape mode (horizontal position, see FIG. 19A) or in a portrait mode (vertical position, see FIG. 20A), or whether the image is viewed horizontally (see FIGS. 19B and 20C), or the image is viewed vertically (see FIGS. 19C and 20B).

When the user takes a picture in a landscape mode (horizontal position) as shown in FIG. 19A, the taking lenses on the left are lenses 2 and 4, and the taking lenses on the right are lenses 1 and 3. With the mapping method as shown in FIG. 17, the sensed signals from the pixels in the image sensor 2' and 4' (under the lenses 2 and 4) would be arranged in display elements 2" and 4" in the display units so as to allow the left eye of a viewer to see, and the sensed signals from the pixels in the image sensors 1' and 3' (under the lenses 1 and 3, see FIGS. 12A and 12B) would be arranged in the display elements 1" and 3" so as to allow the right eye of the viewer to see. As such the stereoscopic pair of images has the parallax between lenses 1 and 2, and the parallax between lenses 3 and 4. When the stereoscopic image is displayed horizontally as shown in FIG. 19B, or is displayed vertically as shown in FIG. 19C, the viewer's left eye (L) sees the image portions taken by the left lenses 2 and 4, while the viewer's right eye (R) sees the image portions taken by the right lenses 1 and 3. The orientation sensor 60 (see FIG. 12A) causes the image to be displayed horizontally or vertically depending on how the mobile device is held. Thus, the taking lenses 1 and 3 are configured to form a first pair of component images to provide the display elements 1" and 3", and taking lenses 2 and 4 are configured to form a second pair of component images to provide the display elements 2" and 4".

When the user takes a picture in a portrait mode (vertical position) as shown in FIG. 20A, the taking lenses on the left are lenses 1 and 2, and the taking lenses on the right are lenses 3 and 4. With the mapping method as shown in FIG. 17, the sensed signals from the pixels in the image sensor 1' and 2' (under the lenses 1 and 2) would be arranged in display elements 1" and 2" in the display units so as to allow the left eye (L) of the viewer to see, and the sensed signals from the pixels in the image sensors 3' and 4' (under the lenses 3 and 4) would be arranged in the display elements 3" and 4" so as to allow the right eye (R) of the viewer to see (FIGS. 20B and 20C). As such, the stereoscopic pair of images has the parallax between lenses 3 and 1 and between lenses 4 and 2. When the stereoscopic image is displayed vertically as shown in FIG. 20B or is displayed horizontally as shown in FIG. 20C, the viewer's left eye (L) sees the image portions taken by the left lenses 1 and 2, while the viewer's right eye (R) sees the image portions taken by the right lenses 3 and 4. Thus, the taking lenses 3 and 4 are configured to form a third pair of component images to provide the display elements 3" and 4", and taking lenses 1 and 2 are configured to form a fourth pair of component images to provide the display elements 1" and 2".

It should be noted that a column of display elements, such as display elements $50_1$, $50_3$ in FIG. 16B is equivalent to one half of an area strip 72 as shown in FIG. 8, and a column of display elements such as display elements $50_2$, $50_4$ in FIG. 16B is equivalent to the other half of the area strip 72. Thus, a compressed image strips of image 122 (FIG. 5), for example, is composed of the image content in the first pair of component images formed by lenses 1 and 3 (FIG. 16B). Likewise, a compressed image strips of image 123, for example, is composed of the image content in the second pair of component images formed by lenses 2 and 4.

Figure 21:
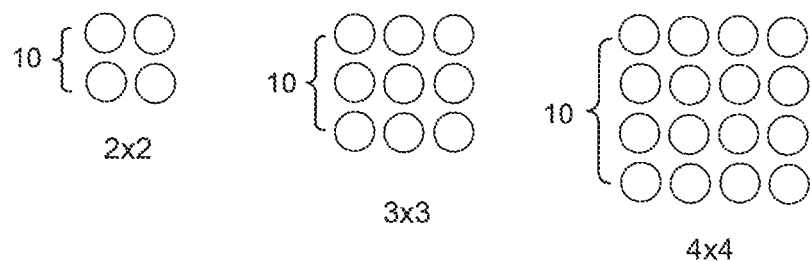
FIG. 21 shows different camera lens arrays.
Figure 22:
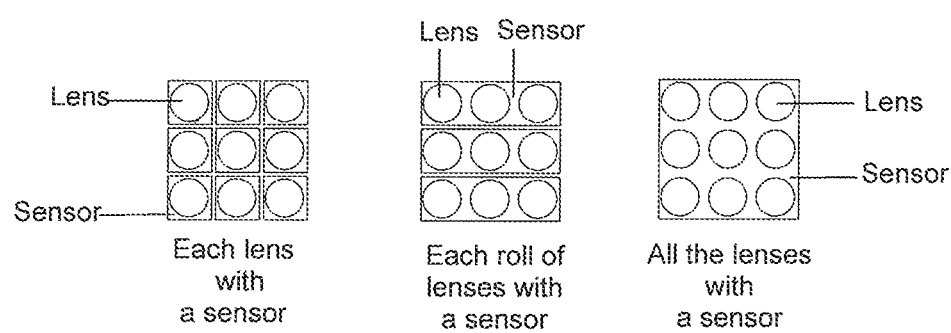
FIG. 22 shows different image sensor arrays associated with a 3×3 lens array.

It should be noted that, the lens array 10 can have n×n lenses, where n can be a positive integer from 2 to 10 or larger. As shown in FIG. 21, the lens array 10 has an array of 2×2 lenses, 3×3 lenses or 4×4 lenses. The number of image sensors can be the same as the number of lenses or an image sensor can be shared by a number of lenses. As shown in FIG. 22, with an array of 3×3 lenses, there can be nine image sensors, and each of the image sensors is associated with one lens. Alternatively, the number of image sensors is three, and each of the image sensors is shared by three lenses. In a different embodiment, there is only one image sensor to be shared with all nine lenses.

It should be noted that, as shown in FIGS. 12A and 12C, the mobile device 100 has two display areas: an information display area 14 on one side of the mobile device 100 and a separate 3D image display area 70 on the other side of the mobile device 100. In a different embodiment of the present invention, the information display area 14 is integrated into the 3D image display area 70. That is, the same image display area 20 can be used to display a 3D image as well as a 2D image or 2D text messages, etc.

The lens array 10 as shown in FIG. 12A has four lenses (1, 2, 3, 4) and the sensor array 20 as shown in FIG. 12B has four sensors (1', 2', 3', 4'). It is possible to use only three lenses (1, 2, 3) and three sensors (1', 2', 3') to carry out the invention.

Figure 23A:
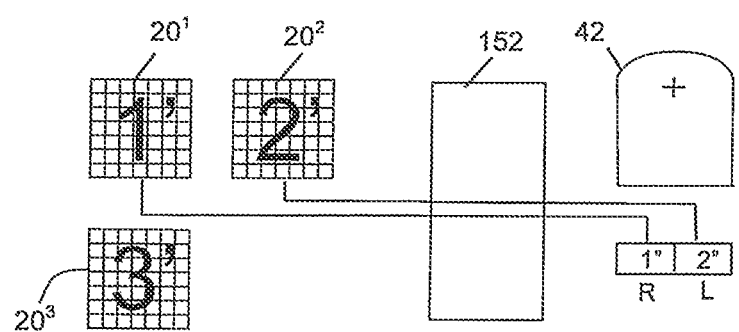
FIG. 23A shows the connection between the image sensors and the image strips under each lenticule when the picture is taken with a mobile device having three lenses while the mobile device is held horizontally.

The user can take a picture in a landscape mode (horizontal position), similar to that shown in FIG. 19A, or in a portrait mode (vertical position), similar to that shown in FIG. 20A. When the user takes a picture in a landscape mode, the taking lens on the left or lens 2 and the taking lens on the right or lens 1 are used for picture taking. When the user takes a picture in a portrait mode, the taking lens on the left or lens 1 and the taking lens on the right or lens 3 are used for picture taking. The orientation sensor 60 is used to determine which two of the three image sensors (1', 2', 3') are used for composing a composite image. When the user takes a picture in a landscape mode as sensed by the orientation sensor 60, the processor 152 causes the image content in a pixel row in image sensor $20_1$ to be conveyed to the display panel 70 for display as an image strip 1" and the image content in a corresponding pixel row in image sensor $20_2$ to be conveyed to the display panel for display as an image strip 2", as shown in FIG. 23A. When the user takes a picture in a portrait mode as sensed by the orientation sensor 60, the processor 152 causes the image content in a pixel row in image sensor $20_1$ to be conveyed to the display panel 70 for display as an image strip 1" and the image content in a corresponding pixel row in image sensor $20_3$ to be conveyed to the display panel for display as an image strip 3", as shown in FIG. 23B.

Figure 23B:
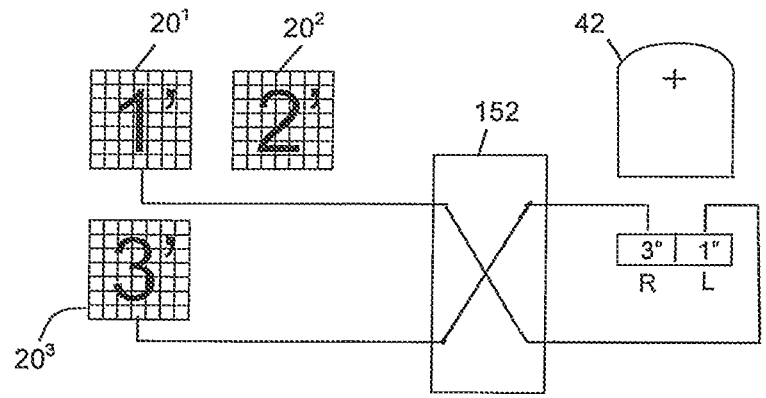
FIG. 23B shows the connection between the image sensors and the image strips under each lenticule when the picture is taken with a mobile device having three lenses while the mobile device is held vertically.

As shown in FIGS. 23A and 23B, each image segment with an R image strip and an L image strip in the composite 170 will be covered by a lenticule 42 which allows the left eye of a viewer to see the L image strip and the right eye to see the R image strip. As such, through the lenticular screen 40, the composite image 170 displayed on the display area 70 will appear to be a 3D image (see FIG. 8).

Figure 8A:
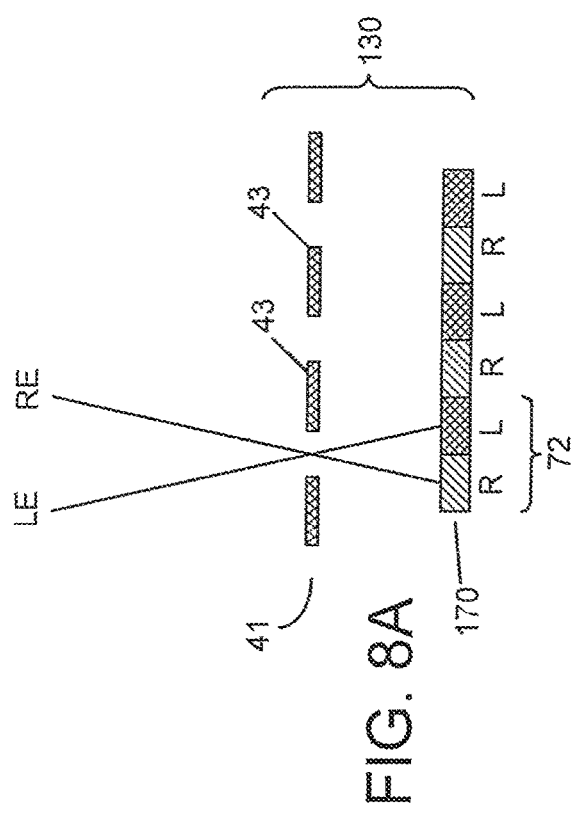
FIG. 8A shows a section of a parallax barrier and part of a composite image displayed on the display panel.

It should be noted that a lenticular screen is one type of parallax sheet with the lenticule be used as a parallax separation unit. Thus, a parallax barrier 41 can be used in place of the lenticular screen 40. The parallax barrier 41 has a plurality of substantially opaque segments 43 be used as a plurality of parallax separation units as shown in FIG. 8A.

It should be noted that the display area 70 as shown in FIG. 2 is rectangular and has a greater dimension in the horizontal direction and a smaller dimension in the vertical direction. For example, if the horizontal direction has N lenslets 82 and the vertical direction has M lenslets, N and M being positive integers with N>M. Since each lenslet has a display unit 50 (see FIG. 15), the display panel would have N×M display units 50. Each display unit 50 has a 2×2 array of display elements (or sub-image elements) as shown in FIG. 17. As shown in FIG. 17, the image contents in one corresponding pixel each of the four image sensors (1', 2', 3', 4') are conveyed to the corresponding one of the display elements (1", 2", 3", 4") in a display unit 50.

In general, an image sensor has a plurality of pixels arranged in a square array of K×L elements with K, L being a positive integer. In order to fully utilize the display panel with N×M display units 50, K should be equal to or greater than N and L should be equal to or greater than M.

When the 3D picture is displayed in a horizontal position or landscape mode as shown in FIG. 19B or 20C, we may select a portion of each image sensor so that only N×M pixels out of the K×L pixels are used to compose a composite image for N×M display units. But when the 3D picture is displayed in a vertical position or portrait mode as shown in FIG. 19C or 20B, we may select a portion of each image sensor so that only M×N pixels out of the K×L pixels are used to compose a composite image for M×N display units. It means that the each image sensor 20 is trimmed to fit the display panel depending upon whether the 3D picture is viewed in a landscape mode or in a horizontal mode. Alternately, a smaller portion of each image sensor is used to compose the composite image.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A 3D imaging system for use on a mobile device, comprising:
 a display area configured to display a 3D image, the display area comprising a display panel and a parallax sheet disposed over the display panel, the parallax sheet comprising a plurality of parallax separating units, each parallax separating unit has a unit width; and
 a processor configured to compose a composite image from a plurality of images, said plurality of images comprise a first image and a second image and to convey signals indicative of the composite image to the display panel for displaying a displayed image indicative of the composite image, the display image comprising a plurality of first image strips and second image strips alternately arranged, the first image strips indicative of the first image and the second image strips indicative of the second image, each of the first and second image strips has a strip width approximately equal to one half of the unit width, wherein the parallax sheet is arranged such that each parallax separating unit approximately covers one of the first image strips and one of the second image strips, wherein the 3D imaging system is operable at least in a first display mode and in a second display mode, such that when the 3D image system is operated in the first display mode, the composite image displayed on the display panel is indicative of a full image of the first and the second images, and when the 3D image system is operated in the second display mode, the composite image displayed on the display panel is indicative of the full image modified by a magnification factor different from 1, and wherein when the 3D imaging system is operated in the first display mode or in the second display mode, the strip width is the same and the unit width is also unchanged so that the strip width is approximately equal to one half of the unit width when the 3D imaging system is operated in the first display mode or in the second display mode.

2. The 3D imaging system according to claim 1, wherein each of the parallax separating units has a longitudinal axis, said imaging system further comprising:
 a plurality of camera lenses comprising a first camera lens and a second camera lens arranged in a direction perpendicular to the longitudinal axis and configured to form the first image and the second image; and a plurality of sensor areas arranged to capture the first image and the second image, wherein the processor is configured to retrieve signals indicative of the first image and the second image from the image sensor areas for composing the composite image.

3. The 3D imaging system according to claim 1, wherein the parallax sheet is selected from a lenticular sheet and a parallax barrier, wherein the lenticular sheet comprises a plurality of lenticules for providing the parallax separating units and the parallax barrier comprises a plurality of opaque strips for providing the parallax separating units.

4. The 3D imaging system according to claim 3, wherein each of the parallax separating units has a longitudinal axis, said imaging system further comprising:

a plurality of camera lenses comprising a first camera lens and a second camera lens and a third camera lens arranged to form the plurality of images, wherein the first and second camera lenses are disposed adjacent to each other in a first direction perpendicular to the longitudinal axis, and the first and third camera lenses are disposed adjacent to each other in a second direction parallel to the longitudinal axis; and a plurality of sensor areas configured to capture the plurality of images, wherein the imaging system is operable in a first picture taking mode and a second picture taking mode, and wherein when the imaging system is operated in the first picture taking mode, the processor is configured to retrieve from the sensor areas signals indicative of the images formed by the first camera lens and the second camera lens for composing the composite image, and when the imaging system is operated in the second picture taking mode, the processor is configured to retrieve from the sensor areas signals indicative of the images formed by the first camera lens and the third camera lens for composing the composite image.

5. The 3D imaging system according to claim 3, further comprising:

a plurality of camera lenses arranged in a first direction and a second direction; wherein said plurality of camera lenses comprise at least a first lens, a second lens and a third lens arranged such that the first and second lenses are arranged in a first direction and the first and third lenses are arranged in a second direction;

a plurality of image sensor areas associated with said plurality of camera lenses, wherein the imaging system is operable in a first picture taking mode and a second picture taking mode, and wherein when the imaging system is operated in the first picture taking mode, the first and second lenses are configured to form the first image and the second image, and the image sensor areas associated with the first and second lenses are configured to capture the first image and the second image; and when the imaging system is operated in the second picture taking mode, the first and third lenses are configured to form the first image and the second image, and the image sensor areas associated with the first and third lenses are configured to capture the first image and the second image.

6. The 3D imaging system according to claim 1, wherein the parallax sheet comprises a two-dimensional array of lenslets, the array including a plurality of lenslet rows in a first direction and a plurality of lenslet columns in a second direction, said imaging system further comprising:

a plurality of camera lenses comprising a first camera lens, a second camera lens and a third camera lens arranged to form the plurality of images, wherein the first and second camera lenses are disposed adjacent to each other in the first direction, and the first and third camera lenses are disposed adjacent to each other in the second direction;

a plurality of sensor areas configured to capture the plurality of images, wherein the imaging system is operable in a first picture taking mode and a second picture taking mode, and wherein when the image system is operated in the first picture taking mode, the processor is configured to retrieve from the sensor areas signals indicative of the images formed by the first camera lens and the second camera lens for composing the composite image, and each parallax separating unit comprises a lenslet column; and when the image system is operated in the second picture taking mode, the processor is configured to retrieve from the sensor areas signals indicative of the images formed by the first camera lens and the third camera lens for composing the composite image, and each parallax separating unit comprises a lenslet row.

7. The 3D imaging system according to claim 1, wherein the parallax sheet comprises a two-dimensional array of lenslets, the array including a plurality of lenslet rows in a first direction and a plurality of lenslet columns in a second direction, said imaging system further comprising:

a first camera lens, a second camera lens, a third camera lens and a fourth lens arranged in a 2×2 array in which the first and second camera lenses are adjacent to each other in a first direction, the third and fourth camera lenses are adjacent to each other in the first direction, the first and third camera lenses are adjacent to each other in a second direction, and the second and fourth camera lenses are adjacent to each other in the second direction; and a plurality of sensor areas configured to capture the plurality of images, wherein the imaging system is operable in a first picture taking mode and a second picture taking mode, and wherein when the image system is operated in the first picture taking mode, the first and third lenses are configured to form a first pair of component images and the second and fourth lenses are configured to form a second pair of component images, such that the first image is composed of the first pair of component images and the second image is composed of the second pair of component images; and when the image system is operated in the second picture taking mode, the third and fourth lenses are configured to form a third pair of component images and the first and second lenses are configured to form a fourth pair of component images, such that the first image is composed of the third pair of component images and the second image is composed of the fourth pair of component images.

8. The 3D imaging system of claim 7, wherein the first picture taking mode is landscape mode and the second picture taking mode is a portrait mode.

9. The 3D imaging system of claim 8, wherein when the imaging system is operated in the first picture taking mode, the first direction is a horizontal direction, and the second direction is a vertical direction.

10. The 3D imaging system of claim 7, wherein the plurality of sensor areas comprise a plurality of sensors, including a first sensor associated with the first camera lens for capturing a first component image, a second sensor associated with the second camera lens for capturing a second component image, a third sensor associated with the third camera lens for capturing a fourth component image, and a fourth sensor associated with the fourth camera lens for capturing a fourth component image, and each of the sensors comprises an array of sensor segments for capturing a part of the corresponding component image, and wherein the displayed image on the display panel comprises a plurality of display units, each display unit associated with a lenslet, each display unit comprising a first display element, a second display element, a third display element and a fourth display element arrange in a 2×2 array in which the first and second display elements are adjacent to each other in the first direction, the third and fourth display elements are adjacent to each other in the first direction, the first and third display elements are adjacent to each other in the second direction and the second and fourth display elements are adjacent to each other in the second direction such that the composite image comprises image contents in the first, second, third and fourth display elements are indicative of signals from a sensor segment in the first sensor, a sensor segment in the second sensor, a sensor segment in the third sensor and a sensor segment in the fourth sensor.

11. The 3D imaging system of claim 10, wherein the displayed image is arranged to be viewed in a first viewing position or in a second viewing position, and wherein each sensor segment comprises a plurality of pixels, and wherein the plurality of display units are arranged in an N by M array, with N and M being positive integers, and the display area is configured for viewing in a first viewing position or in a second viewing position, and when the display area is for viewing in the first viewing position, the plurality of pixels in the sensor segment comprises an N by M pixel array, and when the display area is configured for viewing in the second viewing position, the plurality of pixels in the sensor segment comprises an M by N pixel array.

12. The 3D imaging system of claim 7, further comprising:
an orientation sensor configured to determine whether the imaging system is operated in the first picture taking mode or in the second picture taking mode.

13. The 3D imaging system of claim 1, wherein when the magnification factor is greater than 1, the composite image is indicative of only a part of the full image, and when the magnification factor is smaller than 1, the composite image is indicative of a reduced size of the full image.

14. The method for use in a 3D imaging system according to claim 1, comprising:
modifying the first image and the second image into a first modified image and a second modified image by a magnification factor;

electronically dividing the first modified image into N first image strips and dividing the second modified image into N second image strips;
electronically compressing each of the image strips by a factor of 2 into a compressed image strip;
electronically arranging the N first compressed image strips and the N second compressed image strips in an interlace manner to form an interlaced image; and
conveying signals indicative of the interlaced image to the display panel based on the magnification factor, wherein N is a positive number greater than 10.

15. A mobile device, comprising:
a 3D imaging system according to claim 1,
a plurality of camera lenses for forming the plurality of images; and
a plurality of sensor areas arranged to capture the plurality of images, the sensor areas configured to provide signals to the processor indicative of the plurality of images.

16. The mobile device according to claim 15, wherein the display area is also configured to display information.

17. The mobile device according to claim 15, wherein the display area configured to display the 3D image is disposed on a first side of the mobile device, the mobile device further comprising:
an information display area disposed on a second side of the mobile device.

18. The mobile device according to claim 15, further comprising an apparatus associated with the display area such that when the 3D imaging system is operated in the first mode, the apparatus is configured to allow a user to a selected portion of the displayed image in order to change the magnification factor.

19. The mobile device according to claim 15, further comprising an apparatus associated with the display area such that when the 3D imaging system is operated in the first mode, the apparatus is configured to allow a user to select the magnification factor.

20. The 3D imaging system according to claim 1, wherein when the 3D imaging system is operated in the first display mode, the full image of the first image and the full image of the second image are used to compose a first composite image for displaying on the display panel, and when the 3D image system is operated in the second display mode, a part of the full image of the first image and an equivalent part of the full image of the second image are used to compose a second composite image for displaying on the display panel, wherein the first composite image and the second composite image have a same size.

* * * * *